US011616386B2

(12) United States Patent
Brusky et al.

(10) Patent No.: US 11,616,386 B2
(45) Date of Patent: Mar. 28, 2023

(54) HIGH WCR TRANSFER SWITCH

(71) Applicant: Generac Power Systems, Inc., Waukesha, WI (US)

(72) Inventors: Nick Brusky, Milwaukee, WI (US); Joseph Gerovac, Menominee Falls, WI (US)

(73) Assignee: Generac Power Systems, Inc., Waukesha, WI (US)

(*) Notice: Subject to any disclaimer, the term of this patent is extended or adjusted under 35 U.S.C. 154(b) by 0 days.

(21) Appl. No.: 17/391,572

(22) Filed: Aug. 2, 2021

(65) Prior Publication Data
US 2022/0115900 A1 Apr. 14, 2022

Related U.S. Application Data

(60) Provisional application No. 63/089,438, filed on Oct. 8, 2020.

(51) Int. Cl.
*H01H 1/42* (2006.01)
*H01H 3/28* (2006.01)
(Continued)

(52) U.S. Cl.
CPC .............. *H02J 9/06* (2013.01); *H01H 1/42* (2013.01); *H01H 3/28* (2013.01); *H01H 77/02* (2013.01); *H01H 2300/018* (2013.01)

(58) Field of Classification Search
USPC .......................................................... 307/64
See application file for complete search history.

(56) References Cited

U.S. PATENT DOCUMENTS 10,079,505 B2  9/2018  Zhou et al.
10,163,585 B2  12/2018  Zhou et al.
(Continued)

FOREIGN PATENT DOCUMENTS

| FR | 2449963 | * | 9/1980 |
| FR | 2449963 A1 | | 9/1980 |
| WO | 2017070592 A1 | | 4/2017 |

OTHER PUBLICATIONS

Patent Cooperation Treaty International Searching Authority, Search report and written opinion tor PCT/US2021/044183, dated Nov. 8, 2021, 14 pages.

*Primary Examiner* — Toan T Vu
*Assistant Examiner* — Xuan Ly
(74) *Attorney, Agent, or Firm* — Merchant & Gould P.C.

(57) ABSTRACT

An automatic transfer switch includes a first conduction bar selectively coupled with a first power source and a load conduction bar; a second conduction bar selectively coupled with a second power source and the load conduction bar; a first blade assembly electrically coupled to the first conduction bar; and a second blade assembly electrically coupled to the second conduction bar. The first blade assembly is electrically coupled to a first source conduction bar in a closed position, and a first electromagnetic force induced by a first current flowing through the first blade assembly and the first conduction bar repulses the first blade assembly. The second blade assembly is electrically coupled to a second source conduction bar in a closed position, and a second electromagnetic force induced by a second current flowing through the second blade assembly and the second conduction bar repulses the second blade assembly.

24 Claims, 22 Drawing Sheets

(51) Int. Cl.
*H01H 77/02* (2006.01)
*H02J 9/06* (2006.01)

(56) References Cited

U.S. PATENT DOCUMENTS

| | | | |
|---|---|---|---|
| 2013/0162136 A1* | 6/2013 | Baldwin | H01J 1/30 |
| | | | 313/311 |
| 2017/0117747 A1 | 4/2017 | Zhou et al. | |
| 2017/0239450 A1* | 8/2017 | Kocaturk | A61M 25/09 |
| 2019/0006881 A1 | 1/2019 | Zhou et al. | |
| 2019/0096595 A1 | 3/2019 | Zhou et al. | |
| 2020/0027677 A1* | 1/2020 | Lim | H01H 9/362 |
| 2020/0168421 A1* | 5/2020 | Dye | H01H 3/222 |

\* cited by examiner

HIGH WCR TRANSFER SWITCH

CROSS-REFERENCE TO RELATED APPLICATION(S)

This application claims priority to U.S. Application No. 63/089,438, filed on Oct. 8, 2020, the disclosure of which is hereby incorporated by reference in its entirety.

BACKGROUND

An electrical load uses a transfer switch to switch between a primary power source, such as a utility power source, and a secondary power source, such as a backup power source. For example, if the power from a primary power source is inadequate, such as during a power outage, the transfer switch can automatically switch to the secondary power source so that the electrical load is not without adequate power. Switching between the two power sources can be automatically or manually operated. When the switching is automatically operated, the transfer switch is an automatic transfer switch (ATS).

Traditional transfer switches have used a manually actuated device and, to achieve automatic operation, powered the movement of the transfer switch. During switching, if not done at the proper speed and force, current arcing can damage the contacts used for the primary and secondary power sources. When there is current arcing at high fault current, the contacts can be severely damaged. Further, at high fault current, contacts can fail and lead to a catastrophic event.

One type of transfer switch is an open transition transfer switch. An open transition transfer switch first breaks the electrical connection with one power source (e.g., a utility power source) before making the electrical connection with another power source (e.g., a backup power source). In other words, the open transition transfer switch has a "break-before-make" arrangement. Another type of transfer switch is a closed transition transfer switch. A closed transition transfer switch first makes the electrical connection with one power source (e.g., a backup power source) before breaking the electrical connection with another power source (e.g., a utility power source). In other words, the closed transition transfer switch has a "make-before-break" arrangement. Closed transition transfer switches are used in applications (e.g., airports, hospitals) where a hot-to-hot transfer is needed without loss of critical loads.

Transfer Switches typically have one source from a utility. Available fault currents from a utility are often very high, with values that may exceed 100,000 Amperes RMS. As our society has become more attentive to the dangers inherent in electrical equipment, so has the attention to ensuring equipment is properly applied. Thus, the need to have transfer switch equipment that has a WCR (Withstand Close On Rating) that meets or exceeds the available fault current from the utility. WCRs can be stated as simply as a rated current and voltage for a duration of time. Other WCRs are based on specific ampere and voltage ratings per the upstream protective device (e.g., circuit breaker). Additionally, applications such as hospitals require their electrical equipment to be coordinated during faults. This results in a WCR with a duration of time. Thus the need for transfer switches with WCRs that exceed 100,000 Amps for up to 0.5 seconds exists. WCRs for 0.050 seconds are commonly used, as 0.050 seconds represents a duration of time that is longer than most circuit breakers require to operate; thus are also known as a "any breaker" rating.

SUMMARY

The present disclosure is generally directed to automatic transfer switches. In certain examples, aspects of the present disclosure relate specifically to an automatic transfer switch and an arc extinguishing system of an automatic transfer switch.

One aspect of the present disclosure relates to an automatic transfer switch. The automatic transfer switch includes a first conduction bar selectively coupled with a first power source at a first conduction bar first end and a load conduction bar at a first conduction bar second end. The automatic transfer switch includes a second conduction bar selectively coupled with a second power source at a second conduction bar first end and the load conduction bar at a second conduction bar second end. The automatic transfer switch includes a first blade assembly electrically coupled to the first conduction bar. The first blade assembly is in contact with and electrically coupled to a first source conduction bar in a closed position of the first blade assembly, and a first electromagnetic force induced by a first current flowing through the first blade assembly and the first conduction bar repulses the first blade assembly away from the first conduction bar. The first blade assembly is electrically disconnected from the first source conduction bar in an open position of the first blade assembly. The automatic transfer switch includes a second blade assembly electrically coupled to the second conduction bar. The second blade assembly is in contact with and electrically coupled to a second source conduction bar in a closed position of the second blade assembly, and a second electromagnetic force induced by a second current flowing through the second blade assembly and the second conduction bar repulses the second blade assembly away from the second conduction bar. The second blade assembly is electrically disconnected from the second source conduction bar in an open position of the second blade assembly.

Another aspect of the present disclosure relates an arc extinguishing system of an automatic transfer switch. The automatic transfer switch includes a first source conduction bar connected to a first power source, a second source conduction bar connected to a second power source, and a load conduction bar connected to a load. The arc extinguishing system includes a first arc chamber mounted in a first arc chamber housing. The first arc chamber includes a plurality of first grids and a first movable finger driven by a first linkage and movable with respect to the plurality of first grids. The plurality of first grids and the first movable finger extinguish a first arc generated when the first power source is disconnected. The arc extinguishing system includes a second arc chamber mounted in a second arc chamber housing. The second arc chamber includes a plurality of second grids and a second movable finger driven by a second linkage and movable with respect to the plurality of second grids. The plurality of second grids and the second movable finger extinguish a second arc generated when the second power source is disconnected.

One aspect of the present disclosure relates to an automatic transfer switch. The automatic transfer switch includes a first source conduction bar connected to a first power source, a second source conduction bar connected to a second power source, and a load conduction bar connected to a load. The automatic transfer switch includes a first landing blade having two opposite groove contacting surfaces and mounted at an end of the first source conduction bar. The automatic transfer switch includes a second landing blade having two opposite groove contacting surfaces and mounted at an end of the second source conduction bar. The automatic transfer switch includes a left top conduction bar and a right top conduction bar, and there is an air gap between the right top conduction bar and the left top conduction bar. The automatic transfer switch includes a left stationary bar, a right stationary bar, and an insulating layer between the left stationary bar and the right stationary bar. A top end of the left stationary bar is electrically coupled to the left top conduction bar, and a bottom end of the left stationary bar is electrically coupled to the load conduction bar. A top end of the right stationary bar is electrically coupled to the right top conduction bar, and a bottom end of the right stationary bar is electrically coupled to the load conduction bar. The automatic transfer switch includes a first blade assembly and a second blade assembly. The first blade assembly is electrically coupled and rotatably connected to the left top conduction bar. The first blade assembly has a first blade receiving groove to receive the first landing blade. In a closed position of the first blade assembly, two opposite blade contacting surfaces of the first blade receiving groove slidably interface with the two opposite groove contacting surfaces of the first landing blade, respectively, and a first electromagnetic force induced by a first current flowing through the first blade assembly and the left stationary bar repulses the first blade assembly toward the first landing blade. In an open position of the first blade assembly, the first blade assembly is electrically disconnected from the first landing blade. The second blade assembly is electrically coupled and rotatably connected to the right top conduction bar. The second blade assembly has a second blade receiving groove to receive the second landing blade. In a closed position of the second blade assembly, two opposite blade contacting surfaces of the second blade receiving groove slidably interface with the two opposite groove contacting surfaces of the second landing blade, respectively, and a second electromagnetic force induced by a second current flowing through the second blade assembly and the right stationary bar repulses the second blade assembly toward the second landing blade. In an open position of the second blade assembly, the second blade assembly is electrically disconnected from the second landing blade. The automatic transfer switch includes a first arc chamber mounted in a first arc chamber housing. The first arc chamber includes a plurality of first grids and a first movable finger movable with respect to the plurality of first grids. The plurality of first grids and the first movable finger extinguish a first arc generated when switching the first blade assembly to the open position of the first blade assembly. The automatic transfer switch includes a second arc chamber mounted in a second arc chamber housing. The second arc chamber includes a plurality of second grids and a second movable finger movable with respect to the plurality of second grids. The plurality of second grids and the second movable finger extinguish a second arc generated when switching the second blade assembly to the open position of the second blade assembly.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
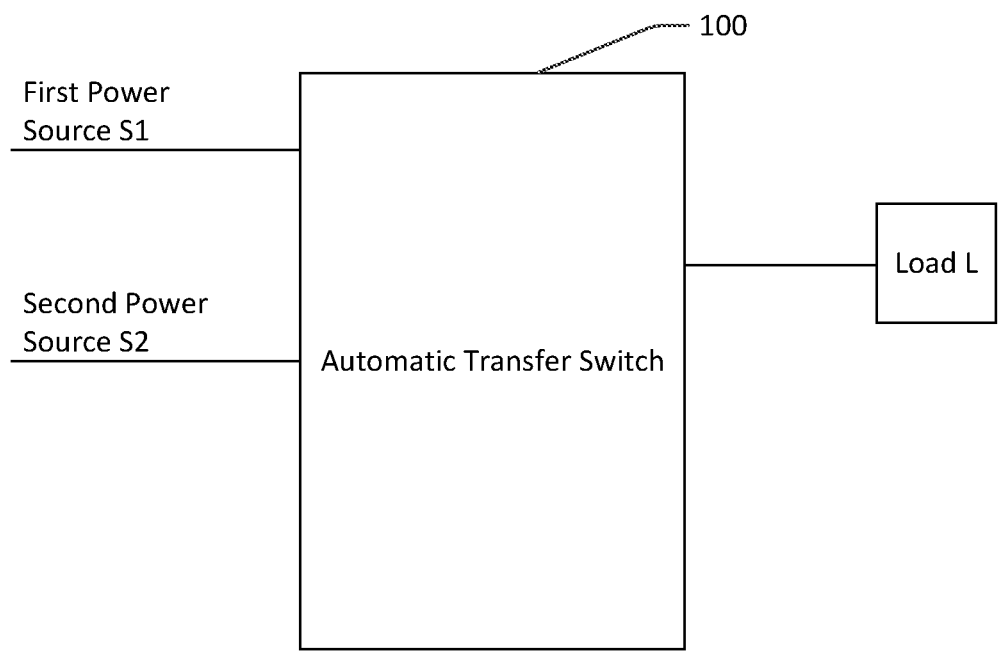
FIG. 1 is a schematic diagram of an automatic transfer switch.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In accordance with embodiments of the disclosure, an automatic transfer switch is provided. As mentioned above, WCR is the rating a transfer switch achieves from being tested at the highest fault current that could be applied to it. Typically, the highest fault current may come from the utility source. The automatic transfer switch has an air gap between a left stationary bar and a right stationary bar. As a result, during a fault current, the fault current flows in a U-shaped manner (i.e., from the left stationary bar, via a load conduction bar, to the right stationary bar). The electromagnetic forces induced by the fault current force rotating blade assemblies into their normal fully closed position at the moment when the rotating blade assemblies touch corresponding landing blades and current begins to flow. As the electromagnetic forces grow proportionally to the fault current, far exceeding mechanical forces, the automatic transfer switch can operate up to a very high WCR. Additionally, the blade assemblies interface with the landing blades in a knife-switch manner, which is beneficial for the stability of electrical connection. This is because the parallel knife blades are near one another, and exert a positive magnetic force towards one another onto the moving contacts. This magnetic force is perpendicular to the contact closing/latching magnetic force. Moreover, arc chambers are separated from the main current-carrying contacts, which reduces electrical arcing wear on the main current-carrying contacts from electrical wear to superficial mechanical wear. It allows simplification of inspection and replacement of the arc chamber wear components.

The disclosure relates to transfer switches, specifically an automatic transfer switch 100. FIG. 1 is a schematic diagram of an automatic transfer switch 100. As shown in FIG. 1, the automatic transfer switch 100 is configured to selectively connect a load L, such as a building, with a first power source S1 or a second power source S2. For example, the automatic transfer switch 100 automatically chooses the second power source S2 (e.g., a backup power source like a backup generator) when it senses a loss of power from the first power source S1 (e.g., a utility power source). Typically, a gasoline, diesel, propane, or natural gas internal combustion engine-powered electrical generator, capable of generating split-phase alternating voltage, may be installed in or near a residence, and arranged to be connected to one or more of the electrical circuits in the residence in order to serve as the backup power source. In some examples, the automatic transfer switch 100 is configured to be operated in current environments ranging from 0 Amps to 400 Amps with voltages ranging from 160 VAC to 312 VAC. In some examples, the automatic transfer switch 100 is configured to be operated in current environments ranging from 600 Amps to 1600 Amps.

Figure 2:
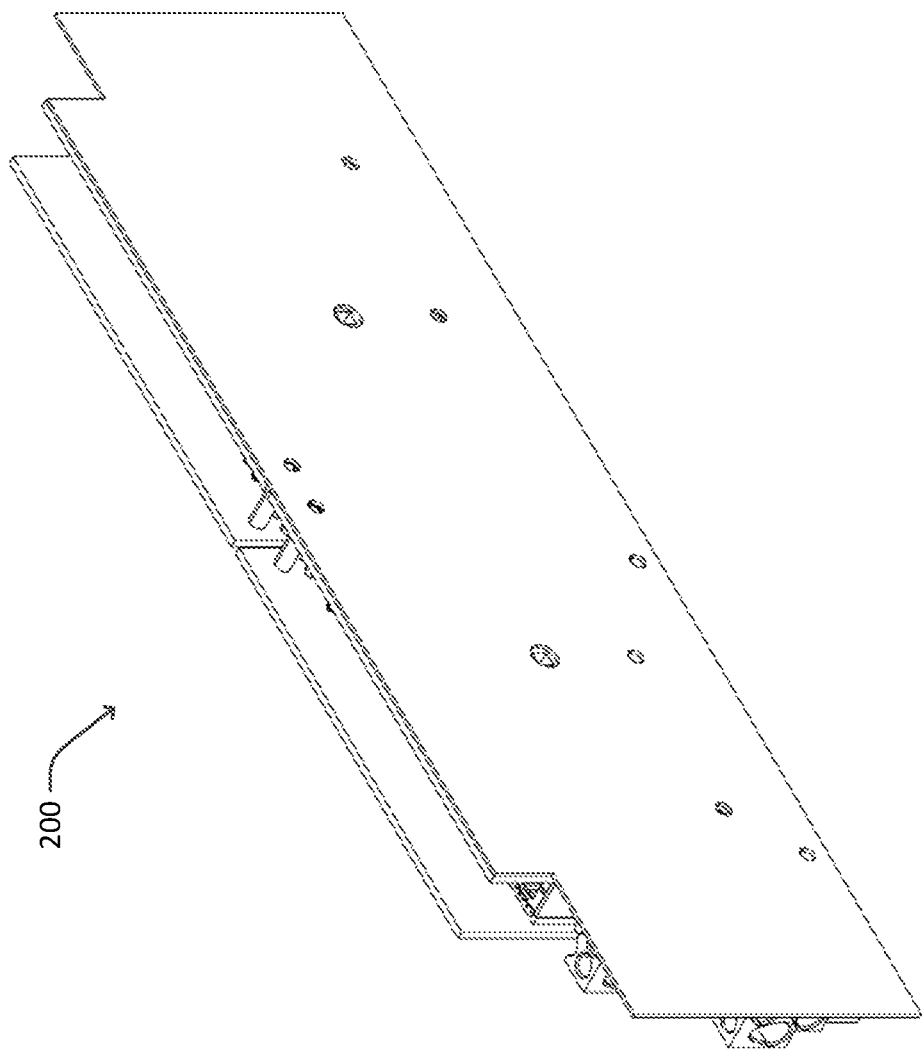
FIG. 2 is a perspective view of an automatic transfer switch assembly including the automatic transfer switch of FIG. 1.
Figure 3:
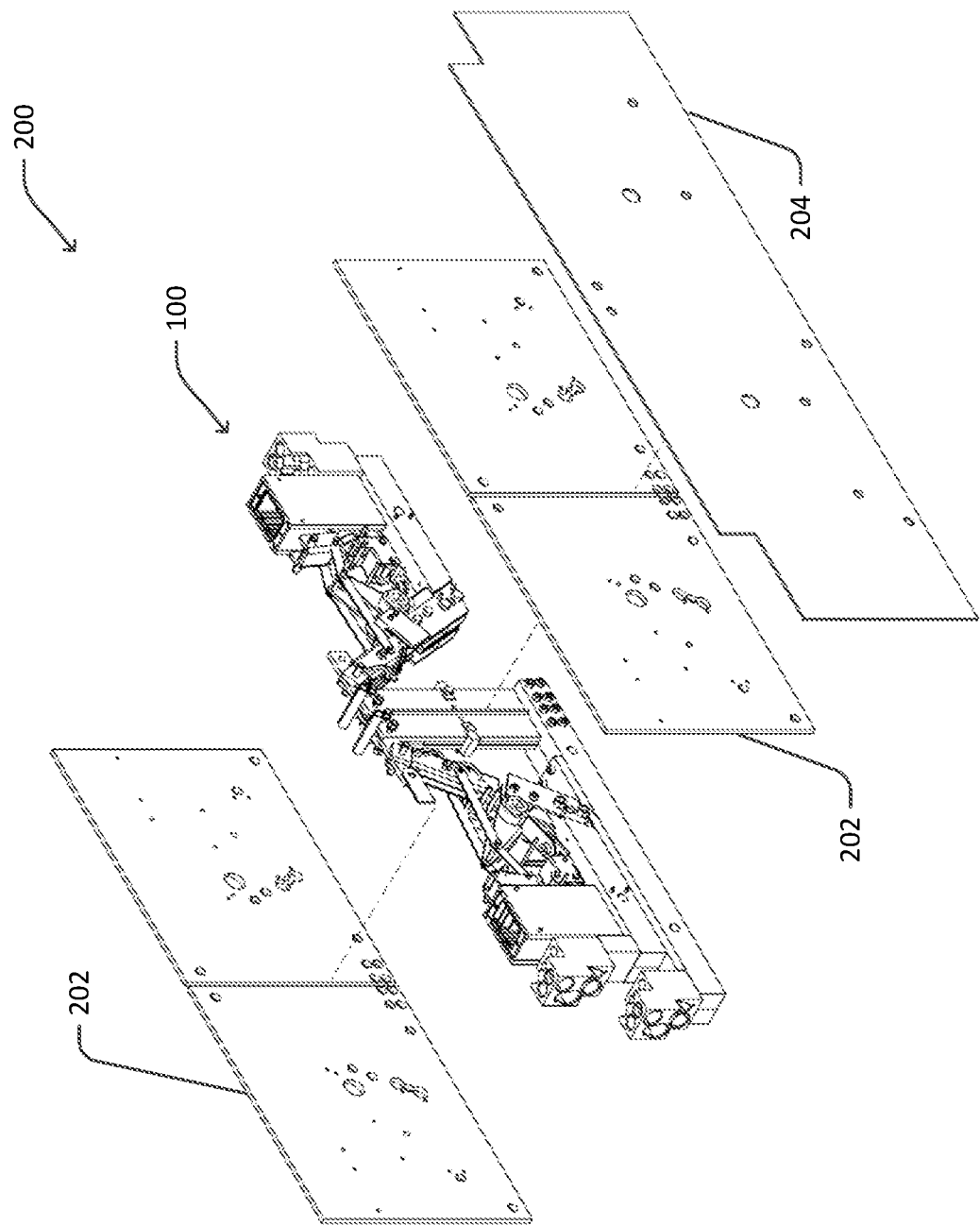
FIG. 3 is an exploded perspective view of the automatic transfer switch assembly of FIG. 2.

FIG. 2 is a perspective view of an automatic transfer switch assembly 200 including the automatic transfer switch of FIG. 1. FIG. 3 is an exploded perspective view of the automatic transfer switch assembly 200 of FIG. 2. As shown in FIG. 3, the automatic transfer switch assembly 200 includes the automatic transfer switch 100, two insulating plates 202, and a back plate 204. The automatic transfer switch 100 is placed between the two insulating plates 202. The two insulating plates 202 provide insulation and protection for the automatic transfer switch 100. It should be noted that multiple (e.g., eight) automatic transfer switches 100 may be placed in parallel insulated by the insulating plates 202 therebetween to increase load capacity, though only one automatic transfer switch 100 is shown in the example in FIG. 2 and FIG. 3 for simplicity. The automatic transfer switch assembly 200 can be mounted in an environment, such as an industrial environment, in a cabinet for easy access by a technician.

Figure 4:
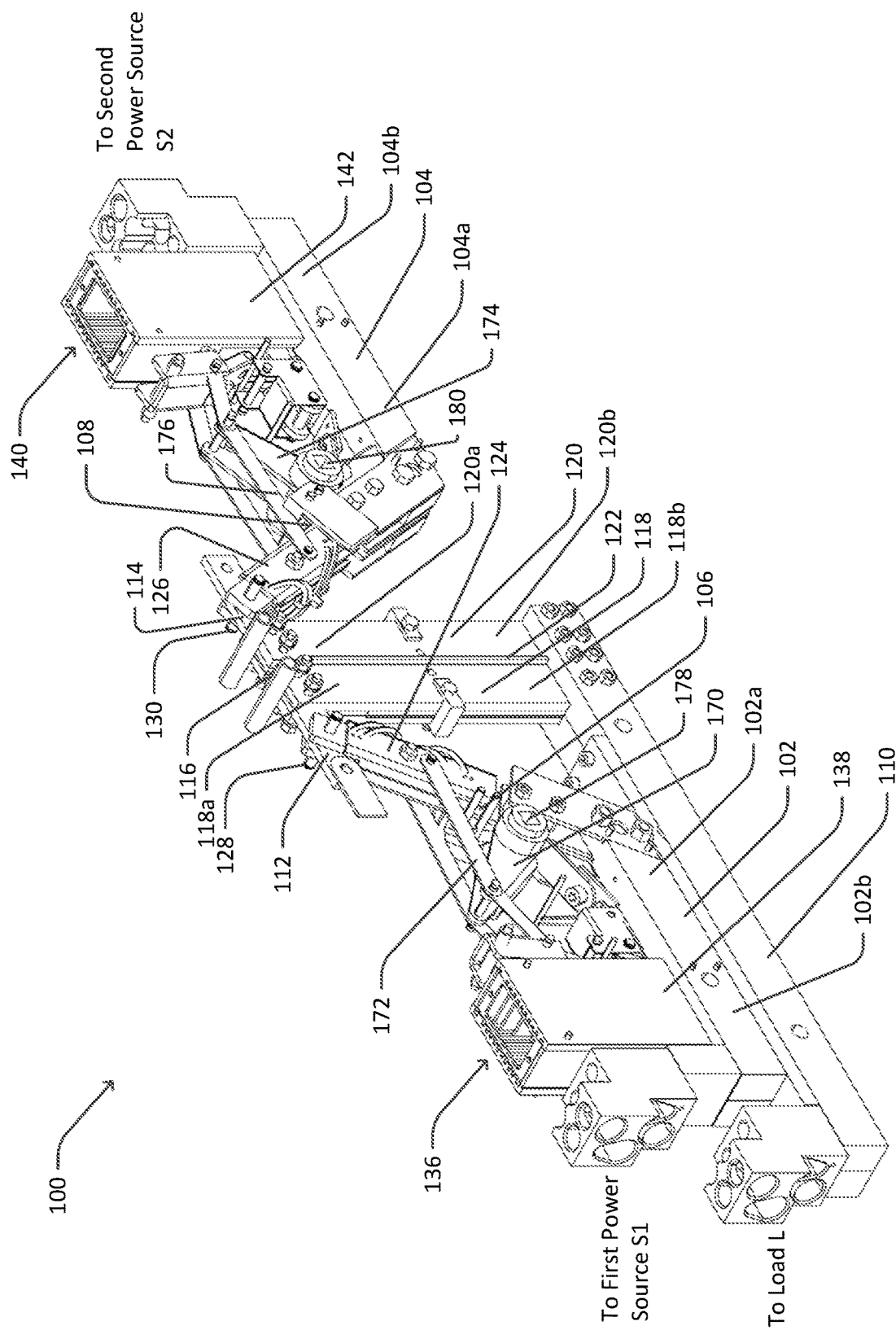
FIG. 4 is a perspective view of the automatic transfer switch of FIG. 3.
Figure 5:
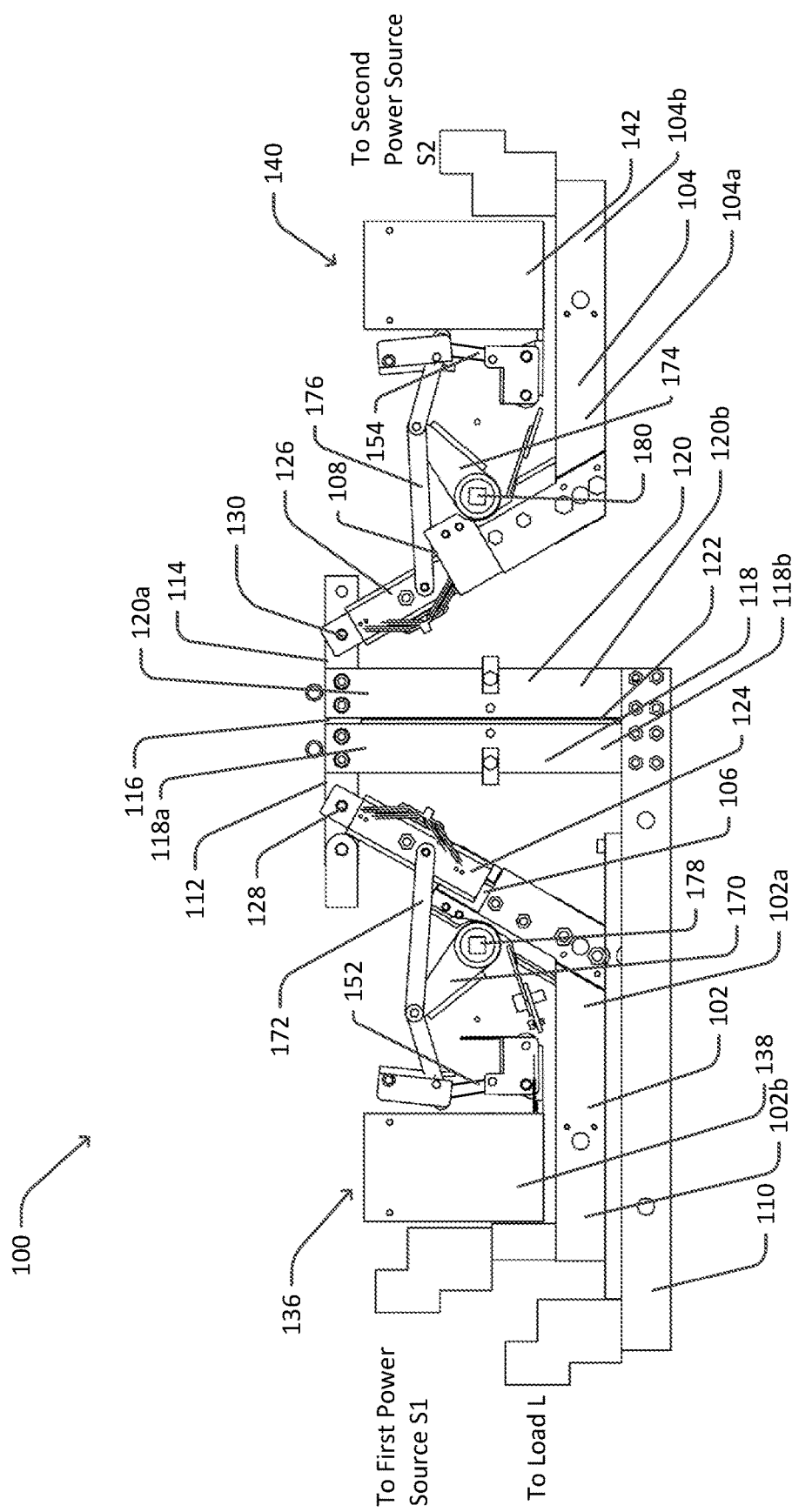
FIG. 5 is a front view of the automatic transfer switch of FIG. 3.
Figure 6:
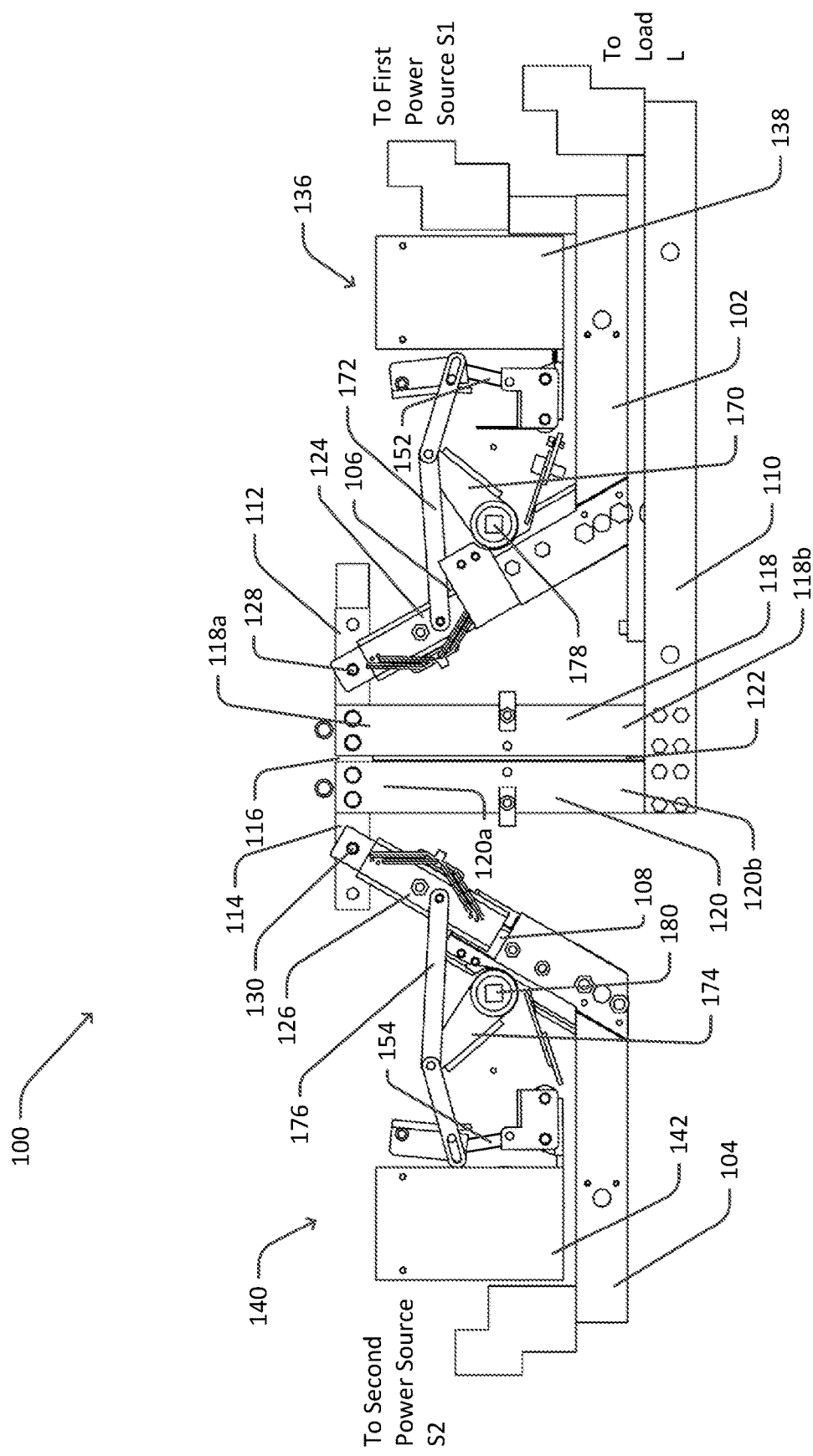
FIG. 6 is a back view of the automatic transfer switch of FIG. 3.

FIG. 4 is a perspective view of the automatic transfer switch 100 of FIG. 3. FIG. 5 is a front view of the automatic transfer switch 100 of FIG. 3. FIG. 6 is a back view of the automatic transfer switch of FIG. 3. In general, the automatic transfer switch 100 is configured to selectively connect the load L with the first power source S1 and/or the second power source S2 by moving two blade assemblies 124 and 126, respectively.

The automatic transfer switch 100 shown in FIG. 4 may be used as either an open transition transfer switch or a closed transition transfer switch. In other words, both the first power source S1 and the second power source S2 can be connected to the load L for a short period of time.

As shown in FIGS. 4-6, the automatic transfer switch 100 includes, among other things, a first source conduction bar 102, a second source conduction bar 104, a load conduction bar 110, a first landing blade 106, a second landing blade 108, a left top conduction bar 112, a right top conduction bar 114, a left stationary bar 118, a right stationary bar 120, an insulating layer 122, a first blade assembly 124, and a second blade assembly 126.

The first source conduction bar 102 is connected to the first power source S1, while the second source conduction bar 104 is connected to the second power source S2. The load conduction bar 110 is connected to the load L. In the example shown in FIGS. 4-6, the first source conduction bar 102, the second source conduction bar 104, and the load conduction bar 110 are parallel to each other.

The left top conduction bar 112 and the right top conduction bar 114 are electrically coupled to the load conduction bar 110 through the left stationary bar 118 and the right stationary bar 120, respectively. Specifically, a top end 118a of the left stationary bar 118 is electrically coupled to the left top conduction bar 112, and a bottom end 118b of the left stationary bar 118 is electrically coupled to the load conduction bar 110. A top end 120a of the right stationary bar 120 is electrically coupled to the right top conduction bar 114, and a bottom end 120b of the right stationary bar 120 is electrically coupled to the load conduction bar 110. In the example shown in FIGS. 4-6, the left stationary bar 118 is parallel to the right stationary bar 120. In the example shown in FIGS. 4-6, the left top conduction bar 112 and the right top conduction bar 114 are both parallel to the load conduction bar 110. In some examples, the top conduction bar 112 and the right top conduction bar 114 are angled with respect to the load conduction bar 110.

In some embodiments, the left stationary bar 118, the right stationary bar 120, and the load conduction bar 110 may be made of a single casting. In one non-limiting example, the single casting is a single aluminum casting. The single casting arrangement may reduce material costs. The single casting may have integral fins to allow heat to escape into the air and reduce material costs further. The integral fins may be located at a variety of places, such as but not limited to, the left stationary bar 118, the right stationary bar 120, and the load conduction bar 110.

The insulating layer 122 is between the left stationary bar 118 and the right stationary bar 120. The insulating layer 122 is electrically nonconductive and electrically insulates the left stationary bar 118 and the right stationary bar 120. The insulating layer 122 can be of a variety of different materials. For example, the insulation layer is made of GPO-3. In the example shown, the insulating layer 122 is a thin layer.

In the example shown, there is an air gap 116 between the right top conduction bar 114 and the left top conduction bar 112. In other words, the right top conduction bar 114 and the left top conduction bar 112 are separated and therefore an electrical current cannot flow directly from the right top conduction bar 114 to the left top conduction bar 112, or vice versa. Instead, an electrical current can flow from the right top conduction bar 114 to the left top conduction bar 112 indirectly through the right stationary bar 120, the load conduction bar 110, and the left stationary bar 118. The benefits of the air gap 116 will be described in detail below with reference to FIGS. 7-9.

The first landing blade 106 is mounted at one end 102a (i.e., a proximal end) of the first source conduction bar 102, while the other end 102b (i.e., a distal end) of the first source conduction bar 102 is connected to the first power source S1. Likewise, the second landing blade 108 is mounted at an end 104a (i.e., a proximal end) of the second source conduction bar 104, while the other end 104b (i.e., a distal end) of the second source conduction bar 104 is connected to the second power source S2.

The first blade assembly 124 is electrically coupled and rotatably connected to the left top conduction bar 112. In the example shown in FIGS. 4-6, the first blade assembly 124 is rotatably connected to the left top conduction bar 112 through a first pin 128, and driven by a first crank 170 through a first blade assembly link 172. Specifically, the first crank 170 is driven by a first shaft 178. It should be noted that the first shaft 178 is driven by any suitable mechanism. In one example, the first shaft 178 is driven by a mechanical mechanism. In another example, the first shaft 178 is driven by an electrical mechanism.

As the first shaft 178 rotates, the first crank 170 rotates accordingly, which in turn drives the first blade assembly link 172 accordingly. The first blade assembly link 172 drives the first blade assembly 124 between closed positions (i.e., positions where the first blade assembly 124 is electrically coupled to the first landing blade 106) and open positions (i.e., positions where the first blade assembly 124 is not electrically coupled to the first landing blade 106), which will be described in detail with reference to FIGS. 10-19. It should be noted that the combination of the first crank 170, the first blade assembly link 172, and the first shaft 178 is only one example of a structure that drives the first blade assembly 124 between the closed positions and the open positions, and other suitable structures are also within the scope of the disclosure.

Likewise, the second blade assembly 126 is electrically coupled and rotatably connected to the right top conduction bar 114. In the example shown in FIGS. 4-6, the second blade assembly 126 is rotatably connected to the right top conduction bar 114 through a second pin 130, and driven by a second crank 174 through a second blade assembly link 176. Specifically, the second crank 174 is driven by a second shaft 180. It should be noted that the second shaft 180 is driven by any suitable mechanism. In one example, the second shaft 180 is driven by a mechanical mechanism. In another example, the second shaft 180 is driven by an electrical mechanism. As the second shaft 180 rotates, the second crank 174 rotates accordingly, which in turn drives the second blade assembly link 176 accordingly. The second blade assembly link 176 drives the second blade assembly 126 between closed positions (i.e., positions where the second blade assembly 126 is electrically coupled to the second landing blade 108) and open positions (i.e., positions where the second blade assembly 126 is not electrically coupled to the second landing blade 108). It should be noted that the combination of the second crank 174, the second blade assembly link 176, and the second shaft 180 is only one example of a structure that drives the second blade assembly 126 between the closed positions and the open positions, and other suitable structures are also within the scope of the disclosure.

As such, the automatic transfer switch 100 can selectively connect the load L to the first power source S1 and/or the second power source S2. Specifically, when the first blade assembly 124 is in the closed position and the second blade assembly 126 is in the closed position, a current flows between the first power source S1 and the second power source S2. This situation happens during a closed transition of the automatic transfer switch 100. When the first blade assembly 124 is in the closed position and the second blade assembly 126 is in the open position, the load L is connected to the first power source S1. When the first blade assembly 124 is in the open position and the second blade assembly 126 is in the closed position, the load L is connected to the second power source S2.

Additionally, the first blade assembly 124 and the second blade assembly 126 may interface with the first landing blade 106 and the second landing blade 108, respectively, in a knife-switch manner, though other manners may also be employed as needed. The knife-switch manner is described in detail below with reference to FIG. 20.

The automatic transfer switch 100 further includes a first arc chamber 136 mounted in a first arc chamber housing 138 and a second arc chamber 140 mounted in a second arc chamber housing 142. The first arc chamber housing 138 is located at the end 102b (i.e., the distal end) of the first source conduction bar 102. The first arc chamber housing 138 is configured to extinguish a first arc generated at the end 102a (i.e., the proximal end) of the first source conduction bar 102 when the first blade assembly 124 is electrically disconnected or connected to the first landing blade 106 (i.e., the first power source S1 is disconnected or connected). The second arc chamber 140 is located at the end 104b (i.e., the distal end) of the second source conduction bar 104. The second arc chamber housing 142 is configured to extinguish a second arc generated at the end 104a (i.e., the proximal end) of the second source conduction bar 104 when the second blade assembly 126 is electrically disconnected or connected to the second landing blade 108 (i.e., the second power source S2 is disconnected or connected). The first arc chamber 136 and the second arc chamber 140 will be described in detail below with reference to FIGS. 11-22.

Figure 7:
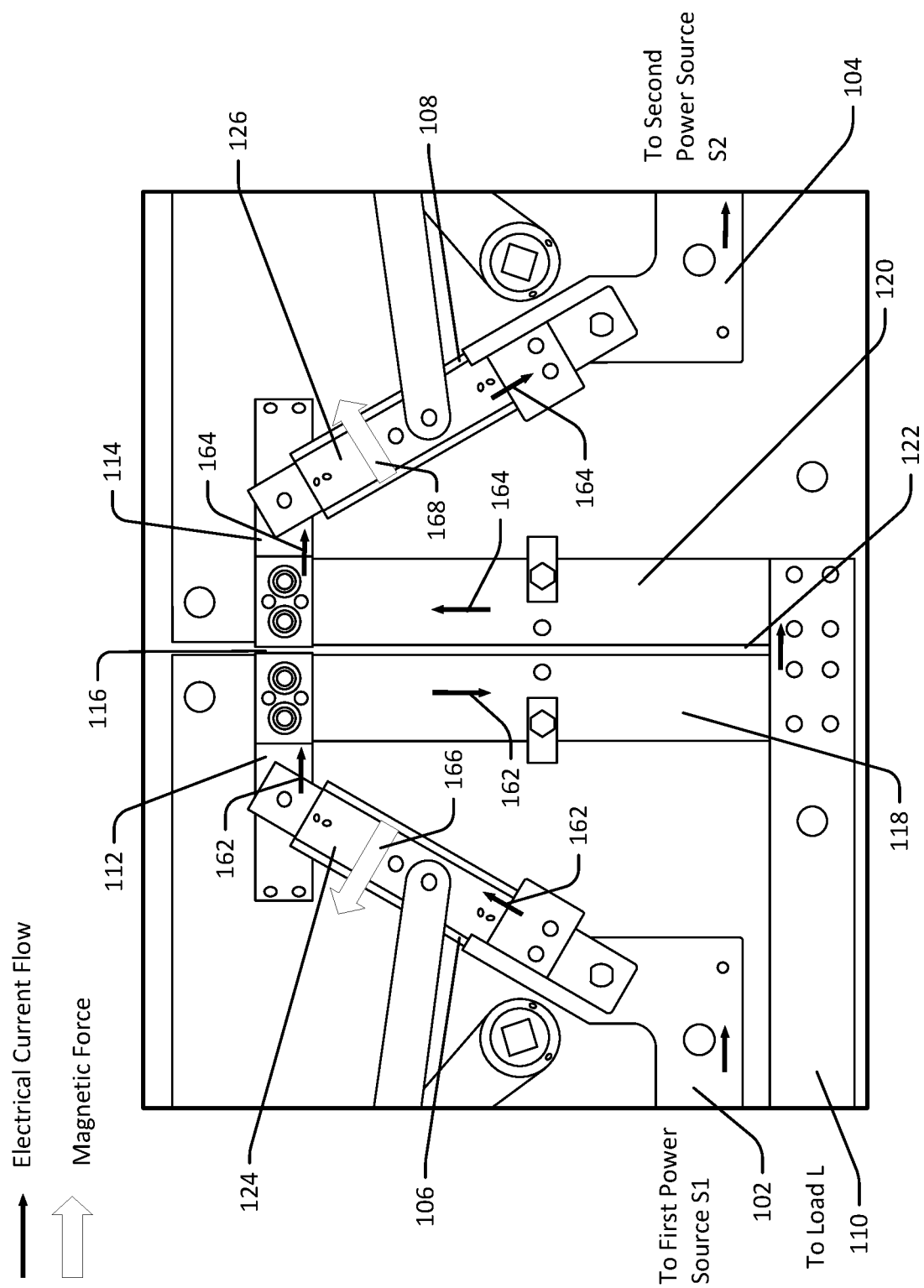
FIG. 7 is a schematic diagram illustrating the automatic transfer switch of FIG. 3 where both the first power source and the second power source are connected.
Figure 8:
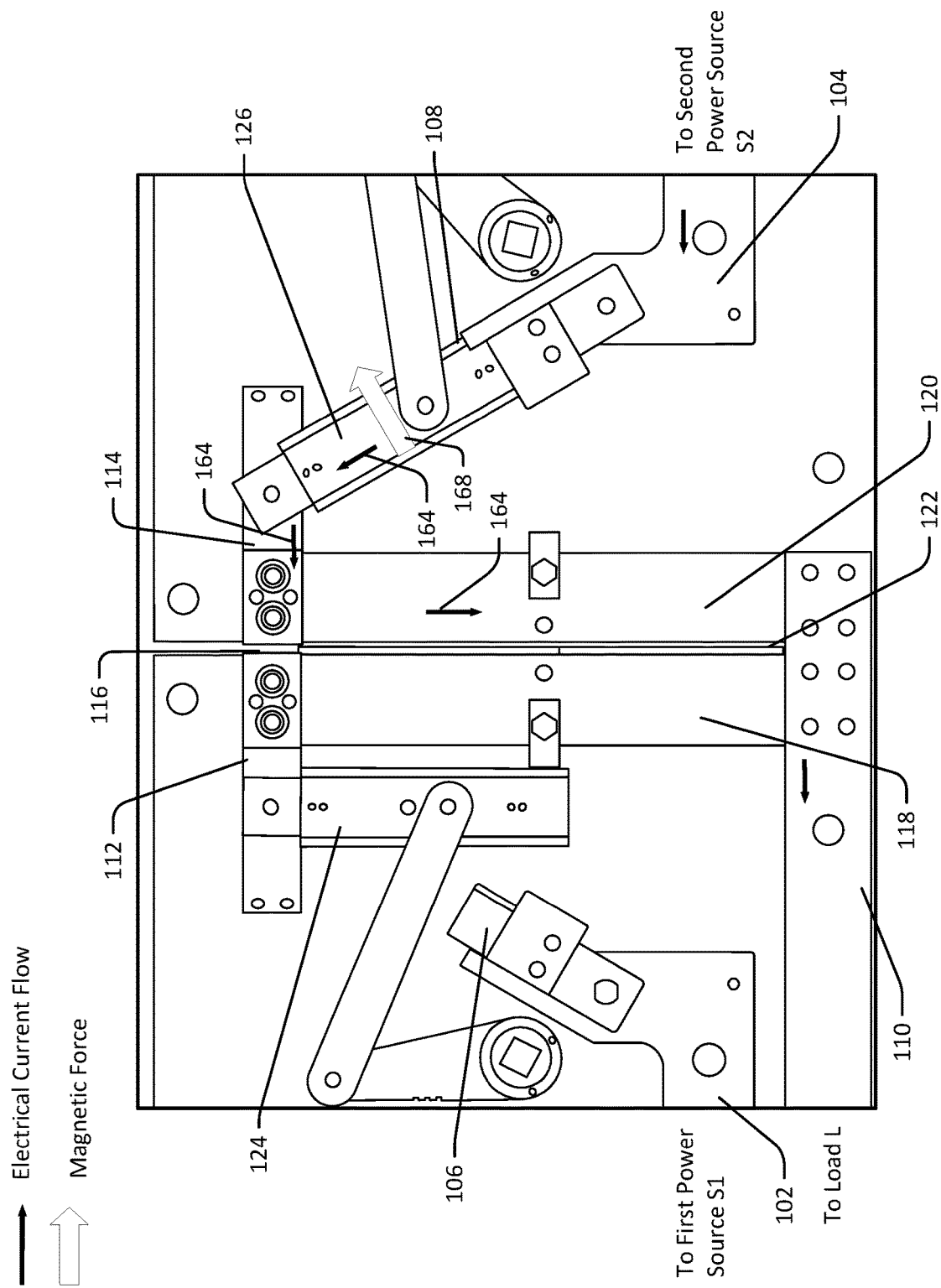
FIG. 8 is a schematic diagram illustrating the automatic transfer switch of FIG. 3 where a first power source is disconnected while a second power source is connected.
Figure 9:
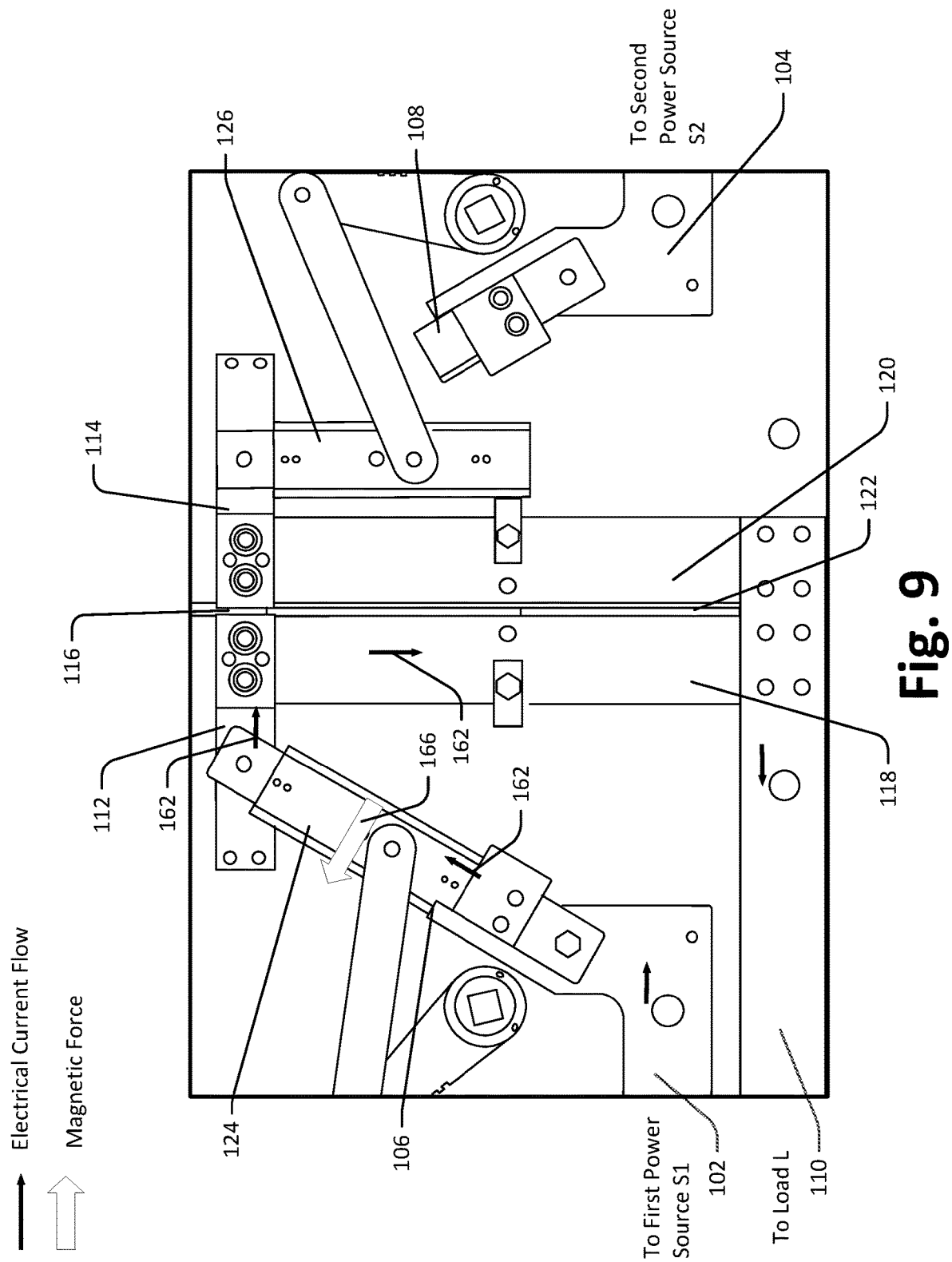
FIG. 9 is a schematic diagram illustrating the automatic transfer switch of FIG. 3 where the first power source is connected while the second power source is disconnected.

FIG. 7 is a schematic diagram illustrating the automatic transfer switch 100 of FIG. 3 where both the first power source S1 and the second power source S2 are connected. FIG. 8 is a schematic diagram illustrating the automatic transfer switch 100 of FIG. 3 where the first power source S1 is disconnected while the second power source S2 is connected. FIG. 9 is a schematic diagram illustrating the automatic transfer switch 100 of FIG. 3 where the first power source S1 is connected while the second power source S2 is disconnected.

As shown in FIG. 7, when both the first power source S1 and the second power source S2 are connected (i.e., the automatic transfer switch 100 is a closed transition transfer switch), the current flows from the first power source S1 to the second power source S2 sequentially through the first source conduction bar 102, the first landing blade 106, the first blade assembly 124, the left top conduction bar 112, the left stationary bar 118, the load conduction bar 114, the right stationary bar 120, the right top conduction bar 114, the second blade assembly 126, the second landing blade 108, and the second source conduction bar 104. Specifically, a first current 162 flowing through the first blade assembly 124 and the left stationary bar 118 induces a first electromagnetic force 166 which repulses the first blade assembly 124 toward the first landing blade 106 because of the directions of the first current 162 in the first blade assembly 124 and the left stationary bar 118.

Likewise, a second current 164 (in the closed transition, the second current 164 and the first current 162 are the same) flowing through the second blade assembly 126 and the left stationary bar 120 induces a second electromagnetic force 168 which repulses the second blade assembly 126 toward the second landing blade 108 because of the directions of the second current 164 in the second blade assembly 126 and the right stationary bar 120. As such, even in the closed transition, the first electromagnetic force 166 and the second electromagnetic force 168 help to maintain the first blade assembly 124 and the second blade assembly 126, respectively, in electrical contact with the first landing blade 106 and the second landing blade 108, respectively.

In summary, due to the existence of the air gap 116, the current (i.e., the first current 162 and the second current 164) flows in a U-shape manner (i.e., from the left stationary bar 118, via the load conduction bar 110, to the right stationary bar 120) in the closed transition. As a result, the first electromagnetic force 166 and the second electromagnetic force 168 keep the first blade assembly 124 and the second blade assembly 126, respectively, in its closed position when in the closed transition. As the first electromagnetic force 166 and the second electromagnetic force 168 grow proportionally to the fault current (i.e., the first current 162 and the second current 164) in the situation of a closed transition, far exceeding mechanical forces, the automatic transfer switch 100 can operate up to a very high WCR. In some embodiments, the first current 162 and the second current 164 have a peak greater than or equal to 100,000 amperes. In other embodiments, the first current 162 and the second current 164 have a peak greater than or equal to 200,000 amperes.

Referring to FIG. 8, the first power source S1 is disconnected while the second power source S2 is connected. In this situation, only the second current 164 exists and the second electromagnetic force 168 keeps the second blade assembly 126 in its closed position.

Referring to FIG. 9, the first power source S1 is connected while the second power source S2 is disconnected. In this situation, only the first current 162 exists and the first electromagnetic force 166 keeps the first blade assembly 124 in its closed position.

Figure 10:
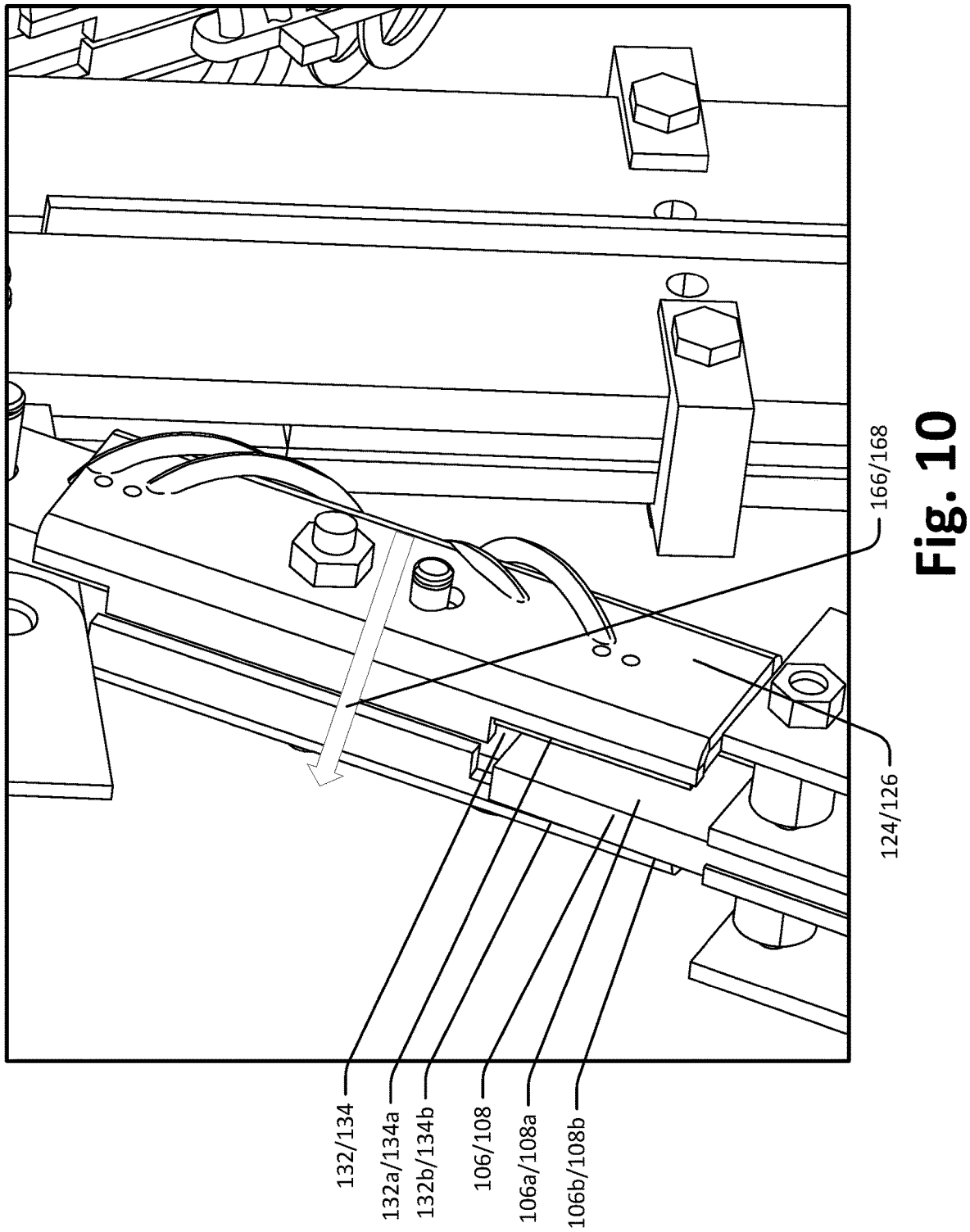
FIG. 10 is a perspective view of a first or second blade assembly and a first or second landing blade of the automatic transfer switch of FIG. 3.

FIG. 10 is a perspective view of the first or second blade assembly 124/126 and the first or second landing blade 106/108 of the automatic transfer switch 100 of FIG. 3. As mentioned above, the first blade assembly 124 and the second blade assembly 126 may interface with the first landing blade 106 and the second landing blade 108, respectively, in a knife-switch manner. As shown in FIG. 10, the first or second blade assembly 124/126 has a first or second blade receiving groove 132/134 to receive the first or second landing blade 106/108. The first or second blade receiving groove 132/134 has two opposite blade contacting surfaces 132a/134a and 132b/134b. In some examples, the blade contacting surfaces 132a/134a and 132b/134b of the first or second blade receiving groove 132/134 may be biased inward. On the other hand, the first or second landing blade 106/108 has two opposite groove contacting surfaces 106a/108a and 106b/108b. The two opposite groove contacting surfaces 106a/108a and 106b/108b slidably interface with the two opposite blade contacting surfaces 132a/134a and 132b/134b when the first or second blade assembly 124/126 is in the closed position. In other words, the interaction between the first or second blade assembly 124/126 and the first or second landing blade 106/108 is gradational, which is beneficial for the stability of electrical connection especially for high WCR transfer switch. Additionally, a repulsive force induced by the first or second current 162/164 at the interfacing surfaces is pushing the two opposite groove contacting surfaces and the two opposite blade contacting surfaces away from each other. In other words, the direction of the repulsive force is perpendicular to the interfacing surfaces, while the direction of the first or second electromagnetic force 166/168 is parallel to the interfacing surfaces. As a result, the repulsive force does not weaken the repulsion of the first or second electromagnetic force 166/168, which is again beneficial for the stability of electrical connection especially for high WCR transfer switch.

Figure 11:
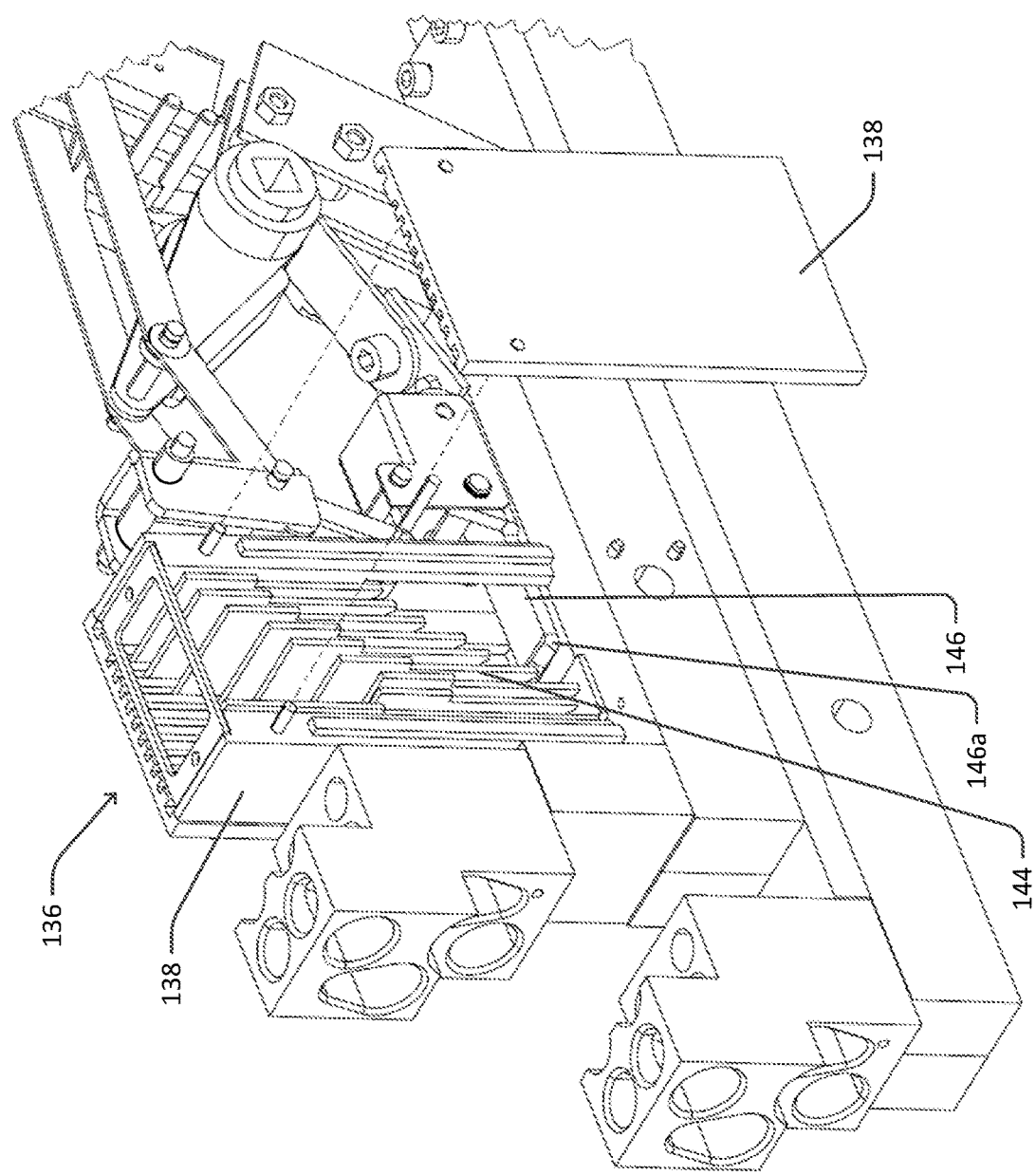
FIG. 11 is a perspective view of a first arc chamber of the automatic transfer switch of FIG. 3.
Figure 12:
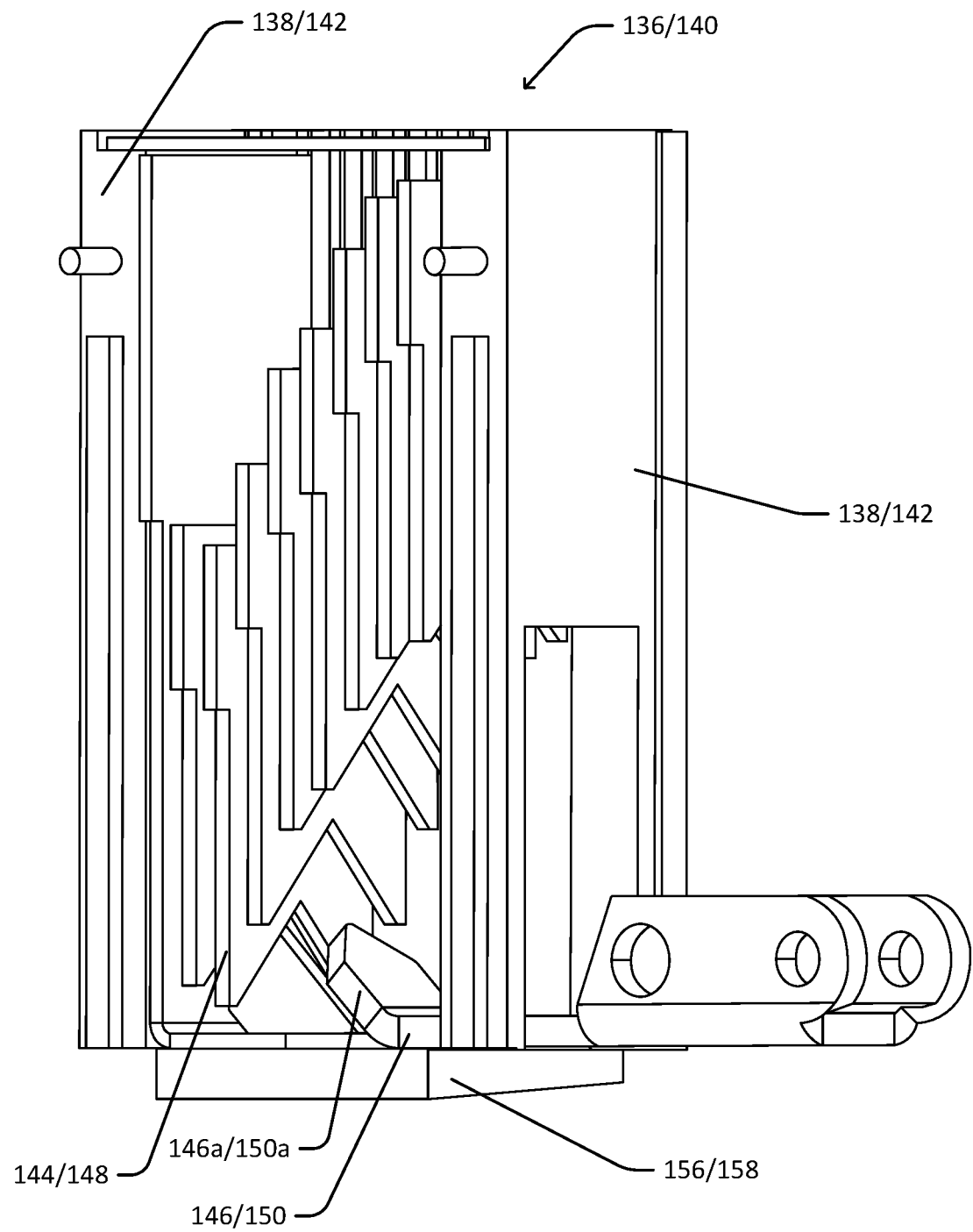
FIG. 12 is another perspective view of the first arc chamber of the automatic transfer switch of FIG. 3.

FIG. 11 is a perspective view of the first arc chamber 136 of the automatic transfer switch 100 of FIG. 3. FIG. 12 is another perspective view of the first arc chamber 136 of the automatic transfer switch 100 of FIG. 3. In the example shown in FIG. 21 and FIG. 22, only the first arc chamber 136 is shown for simplicity, and the second arc chamber 138 may have the same structure as the first arc chamber 136.

Referring to FIGS. 5 and 11-12, the first arc chamber 136 includes, among other things, a plurality of first grids 144 and a first movable finger 146. The movable finger 146 is driven by a first linkage 152 and movable with respect to the plurality of first grids 144. The plurality of first grids 144 and the first movable finger 146 extinguish the first arc generated at the proximal end of the first source conduction bar 102, by stretching and cooling the arc to disruption, when the first blade assembly 124 is electrically disconnected from the first landing blade 106 (i.e., the first power source S1 is disconnected). The intensity of the first arc is determined by factors such as the impressed voltage, the magnitude of the current, and the power factor of the load L. Therefore, the arc extinguishing is critical to high WCR transfer switch.

The first arc chamber 136 can move the first arc into the first arc chamber housing 138. The plurality of first grids 144 surround a free end 146a of the first movable finger 146. In the depicted example, each of the plurality of first grids 144 has a concave side, and the free end 146a of the first movable finger 146 is toward the concave sides of the plurality of first grids 144. As shown in FIG. 5, the first movable finger 146 is driven by the first linkage 152 to rotate with respect to the plurality of first grids 144. In one example, the first linkage 152 moves as the first blade assembly 124 moves. It should be noted that the first movable finger 146 can be driven by other suitable structures/mechanisms. When the first blade assembly 124 is electrically connected to the first landing blade 106, the first movable finger 146 is in contact with a first conduction member 156 connected to the first source conduction bar 102. After the first blade assembly 124 is electrically disconnected from the first landing blade 106, the first movable finger 146 is driven and pulled up by the first linkage 152 and is not in contact with the first conduction member 146.

Since the first arc chamber housing 138 is located at the distal end of the first source conduction bar 102, the large amount of heat, which rapidly increases the temperature of the surrounding air, is contained in the first arc chamber housing 138. As such, the other components (e.g., the first blade assembly 124 and the first landing blade 106) of the automatic transfer switch 100 can be protected. In terms of materials, the plurality of first grids 144, the first movable finger 146, a plurality of second grids 148, and a second movable finger 150 are made of copper against steel, which is both cost effective and wear resistant. Additionally, the combination of copper against steel does not weld at high temperatures, which is beneficial especially for high WCR transfer switch. It should be noted that other materials may be employed as needed for the plurality of first grids 144, the first movable finger 146, the plurality of second grids 148, and the second movable finger 150.

FIGS. 13-22 are diagrams illustrating the operation of the automatic transfer switch 100 of FIG. 3. Specifically, FIGS. 13-18 illustrate a transition of the first blade assembly 124 from its completely closed position to its completely open position, while FIGS. 19-22 illustrate a transition of the first blade assembly 124 from its completely open position to its completely closed position.

Figure 13:
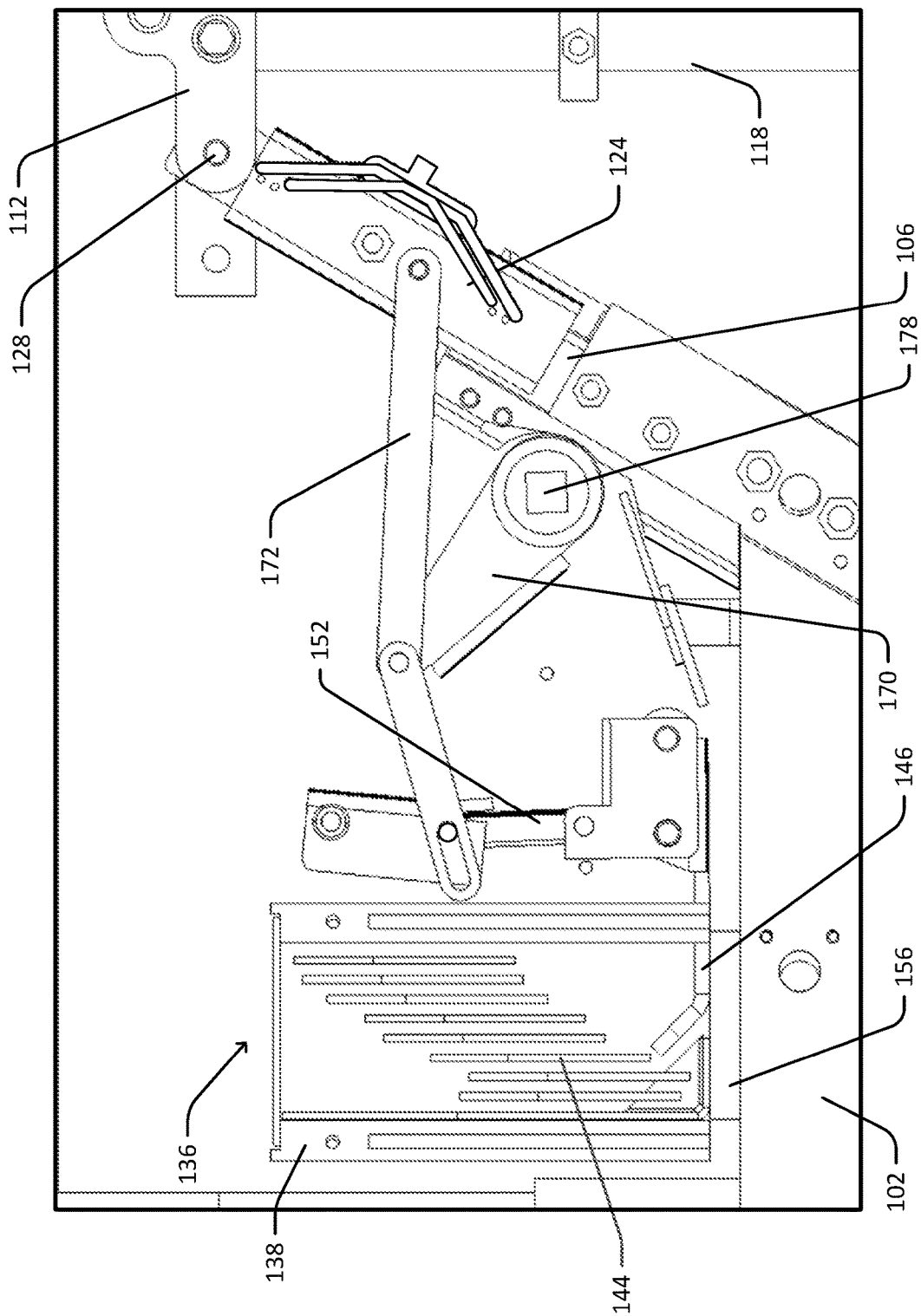
FIG. 13 is a diagram of the automatic transfer switch of FIG. 3 where the first blade assembly is in a completely closed position.
Figure 14:
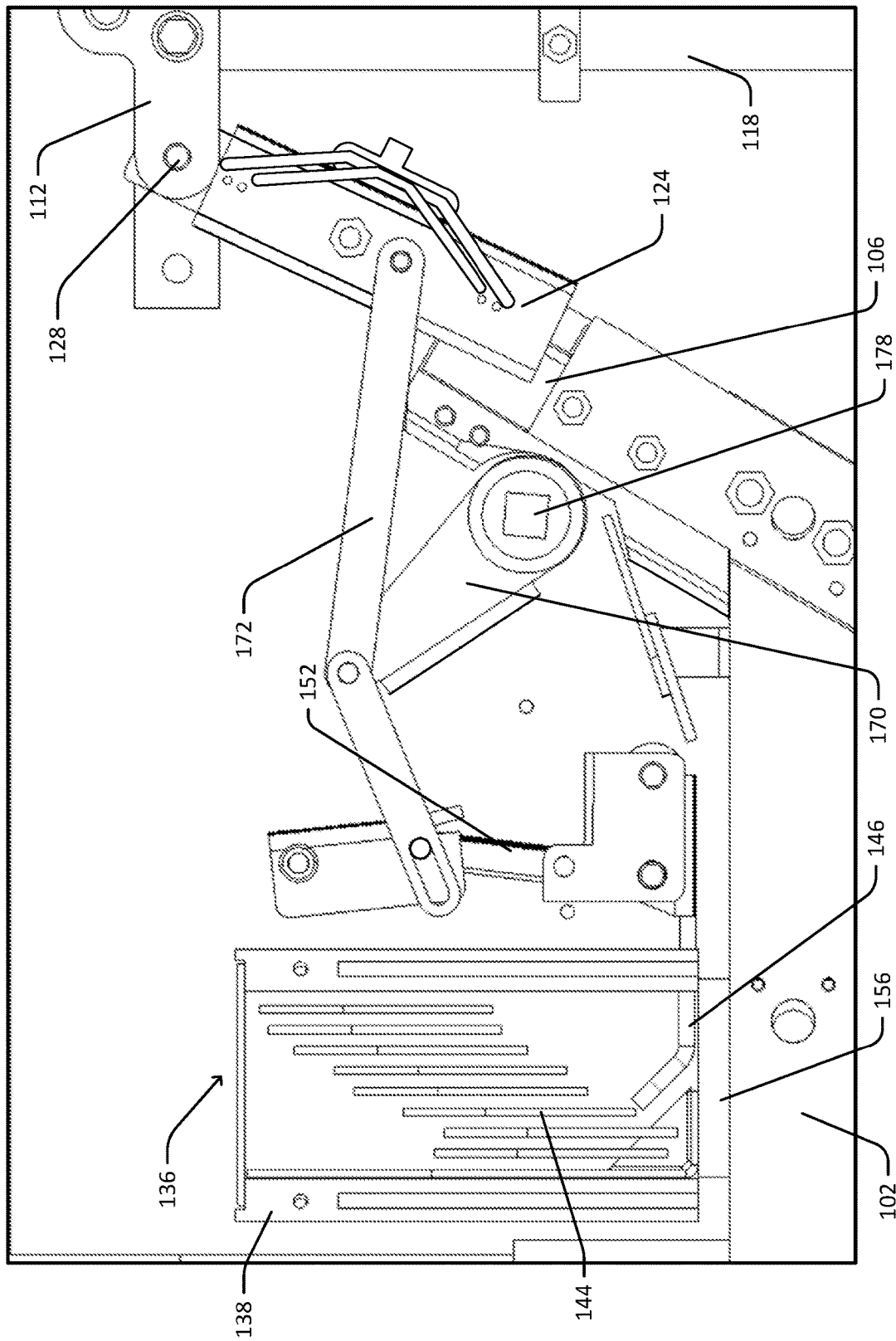
FIG. 14 is a diagram of the automatic transfer switch of FIG. 3 where the first blade assembly is in a closed position.

The first blade assembly 124 is in a completely closed position as shown in FIG. 13. In the completely closed position, the first blade assembly 124 is interfacing with the first landing blade 106 to the greatest extent. As shown in FIG. 14, as the first crank 170, which is driven by the first shaft 178, rotates counterclockwise, the first blade assembly link 172 drives the first blade assembly 124 toward the left stationary bar 118. The first blade assembly 124 is still electrically connected to the first landing blade 106, and the first movable finger 146 is still in contact with the first conduction member 156. Since the voltage potential of the first movable finger 146 is the same as the voltage potential of the plurality of first grids 144, no arcing can occur in the first arc chamber 136.

Figure 15:
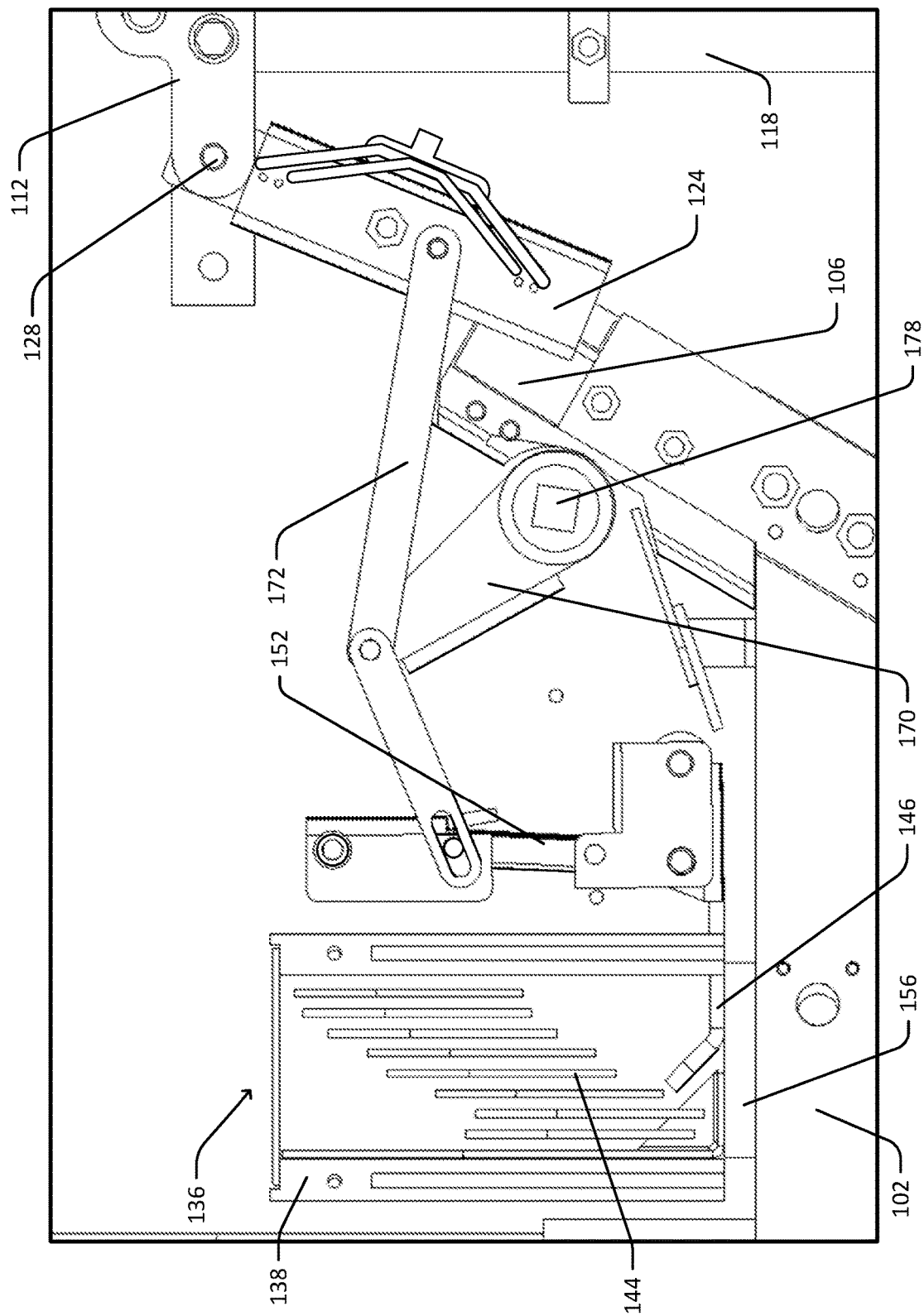
FIG. 15 is a diagram of the automatic transfer switch of FIG. 3 where the first blade assembly is in another closed position.
Figure 16:
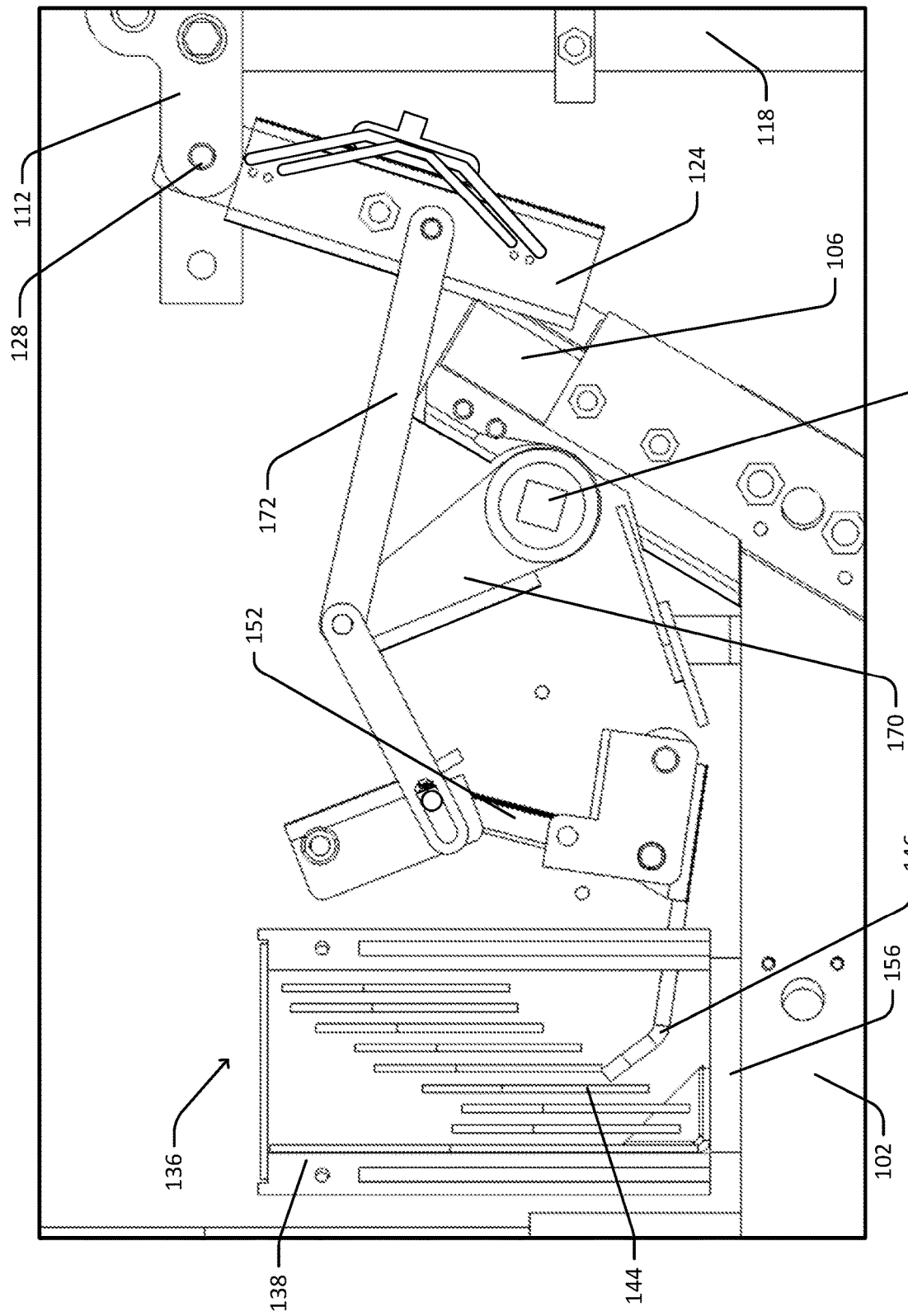
FIG. 16 is a diagram of the automatic transfer switch of FIG. 3 where the first blade assembly is in yet another closed position.
Figure 17:
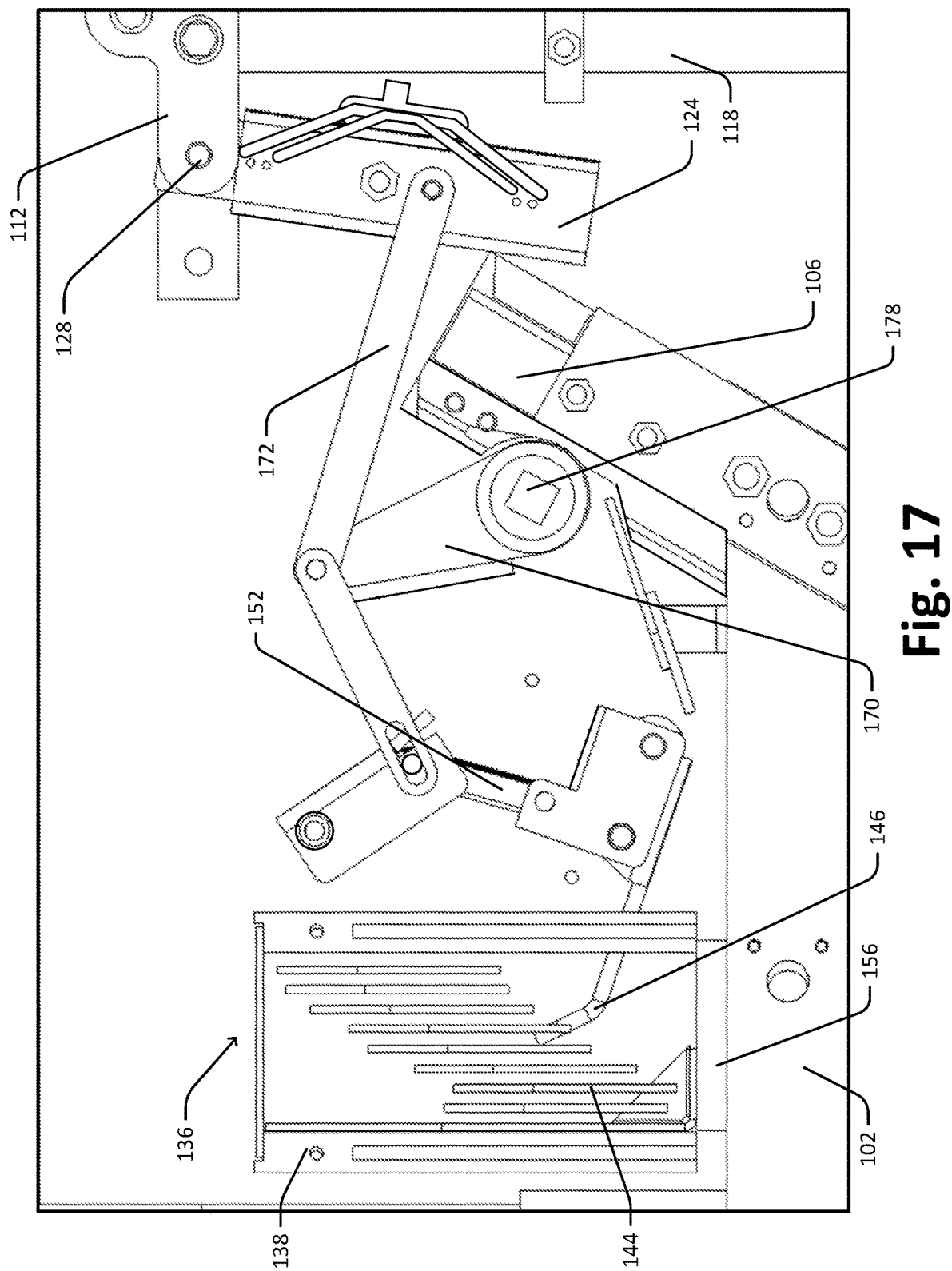
FIG. 17 is a diagram of the automatic transfer switch of FIG. 3 where the first blade assembly is in an open position.

As shown in FIG. 15, the first crank 170 keeps rotating counterclockwise, but the first blade assembly 124 is still electrically connected to the first landing blade 106, and the first movable finger 146 is still in contact with the first conduction member 156. As shown in FIG. 16, the first crank 170 keeps rotating counterclockwise, the first blade assembly 124 is still electrically connected to the first landing blade 106, but the first movable finger 146 is pulled up (by a first linkage 152) and not in contact with the first conduction member 156. As such, the voltage potential of the first movable finger 146 is not the same as the voltage potential of the plurality of the plurality of first grids 144. In other words, the first arc chamber 136 is prepared for arc extinguishing. As shown in FIG. 17, the first crank 170 keeps rotating counterclockwise, the first blade assembly 124 is electrically disconnected from the first landing blade 106. In other words, the first blade assembly 124 is in an open position. Therefore, the first movable finger is not in contact with the first conduction member 156 (i.e., the first arc chamber 136 is prepared) before the first blade assembly 124 is electrically disconnected from the first landing blade 106. In other words, the connection of the main contacts breaks after the arc chamber connection breaks, as shown in FIG. 16. This is made possible by the design of the first crank 170, the first blade assembly link 172, and the first linkage 152 in the shown example of FIGS. 10-15. It should be noted that this timing can be realized by any other suitable structures/mechanisms. Finally as shown in FIG. 15, the first crank 170 keeps rotating counterclockwise until a first stopper 182 stops the first blade assembly 124. The first blade assembly 124 is in its completely open position.

Figure 18:
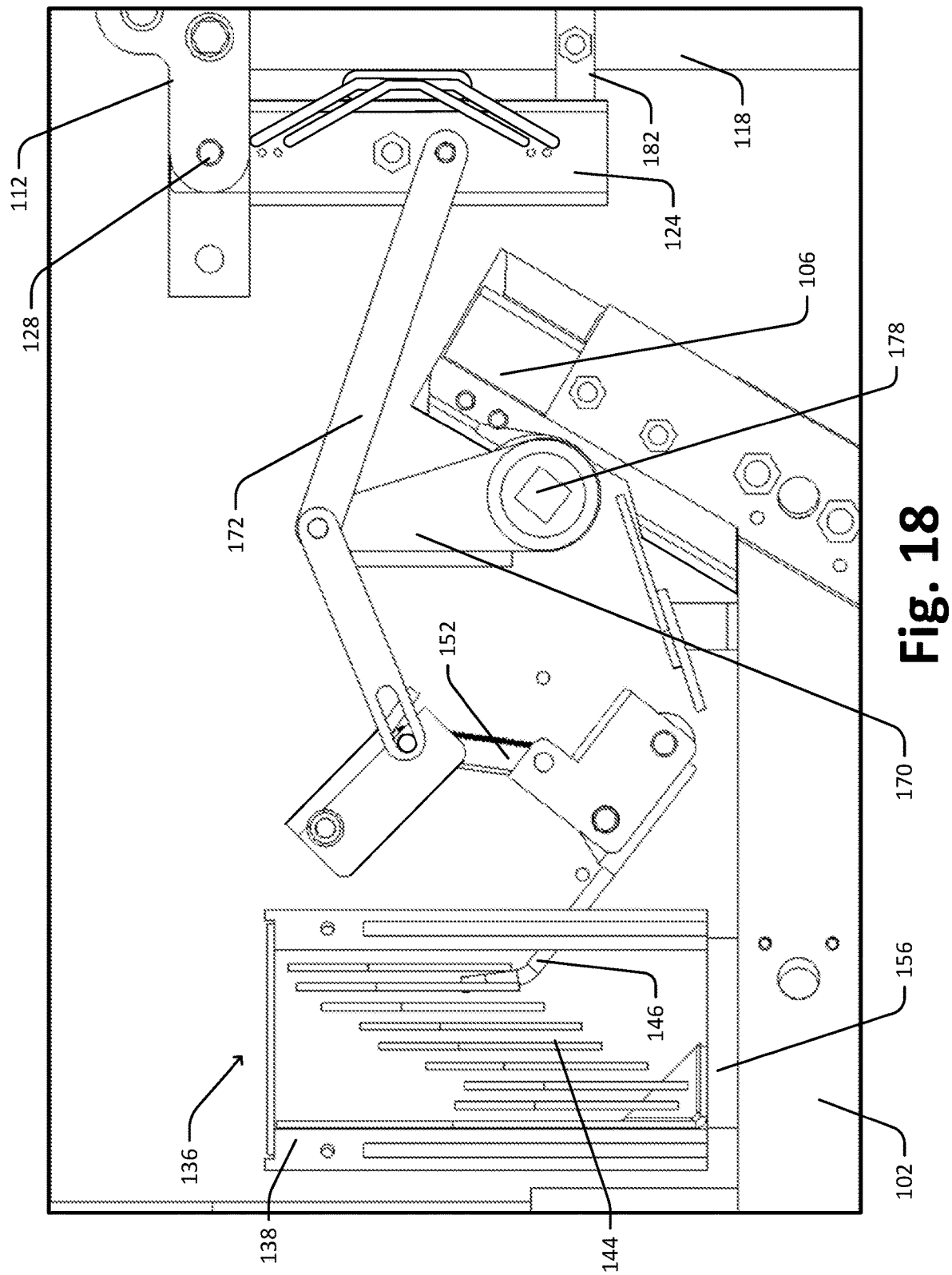
FIG. 18 is a diagram of the automatic transfer switch of FIG. 3 where the first blade assembly is in a completely open position.
Figure 19:
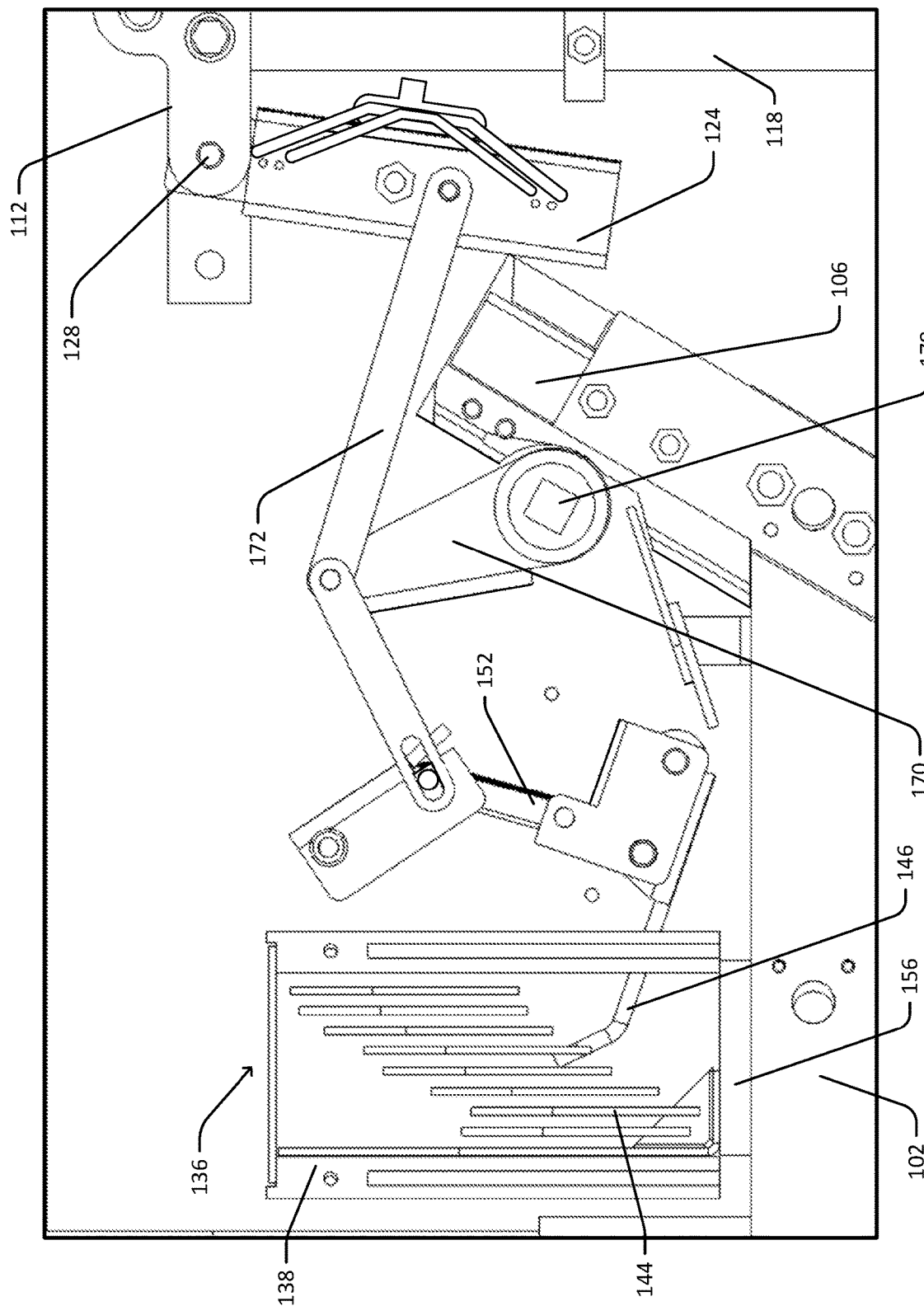
FIG. 19 is a diagram of the automatic transfer switch of FIG. 3 where the first blade assembly is in an open position.
Figure 20:
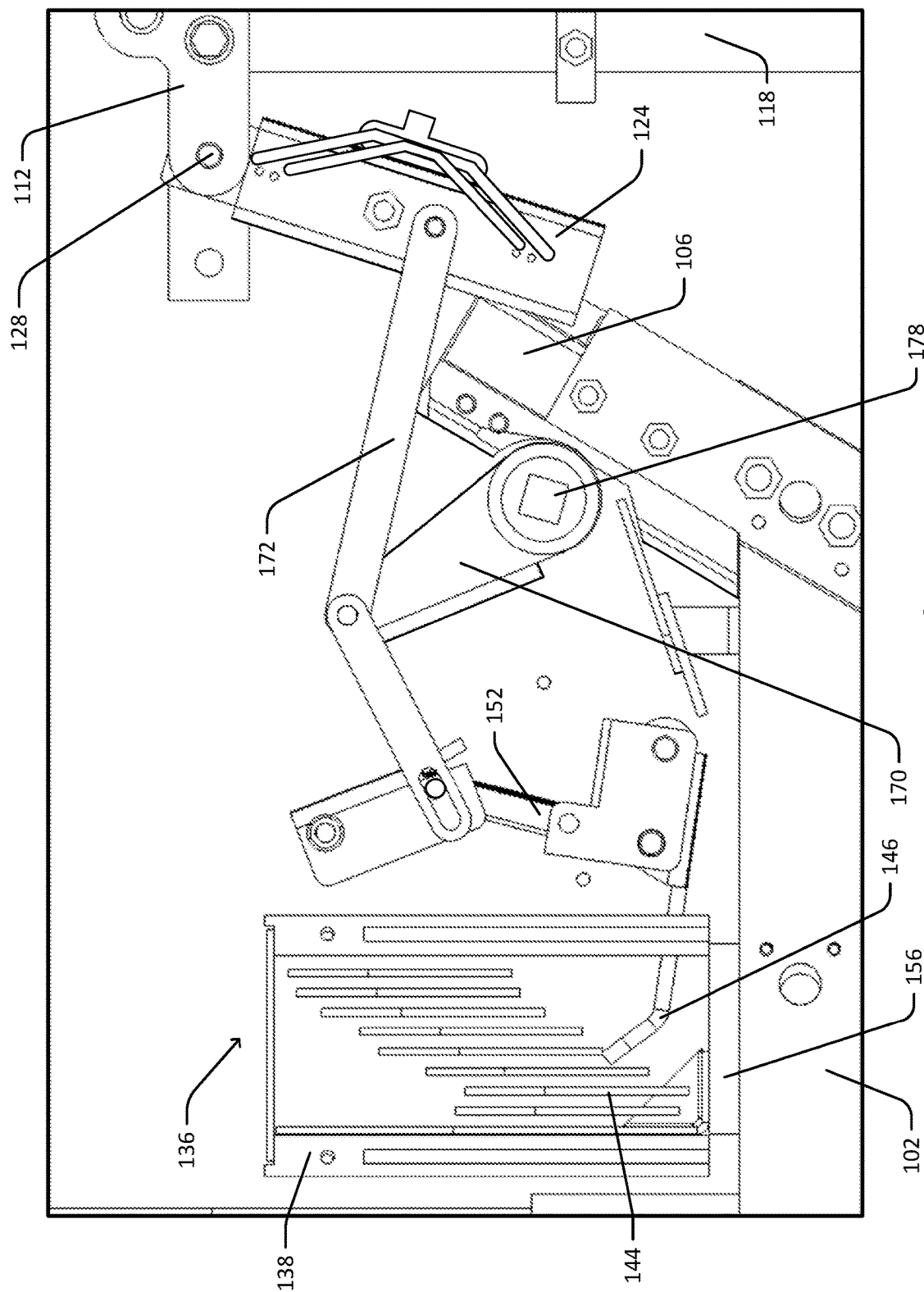
FIG. 20 is a diagram of the automatic transfer switch of FIG. 3 where the first blade assembly is in a closed position.
Figure 21:
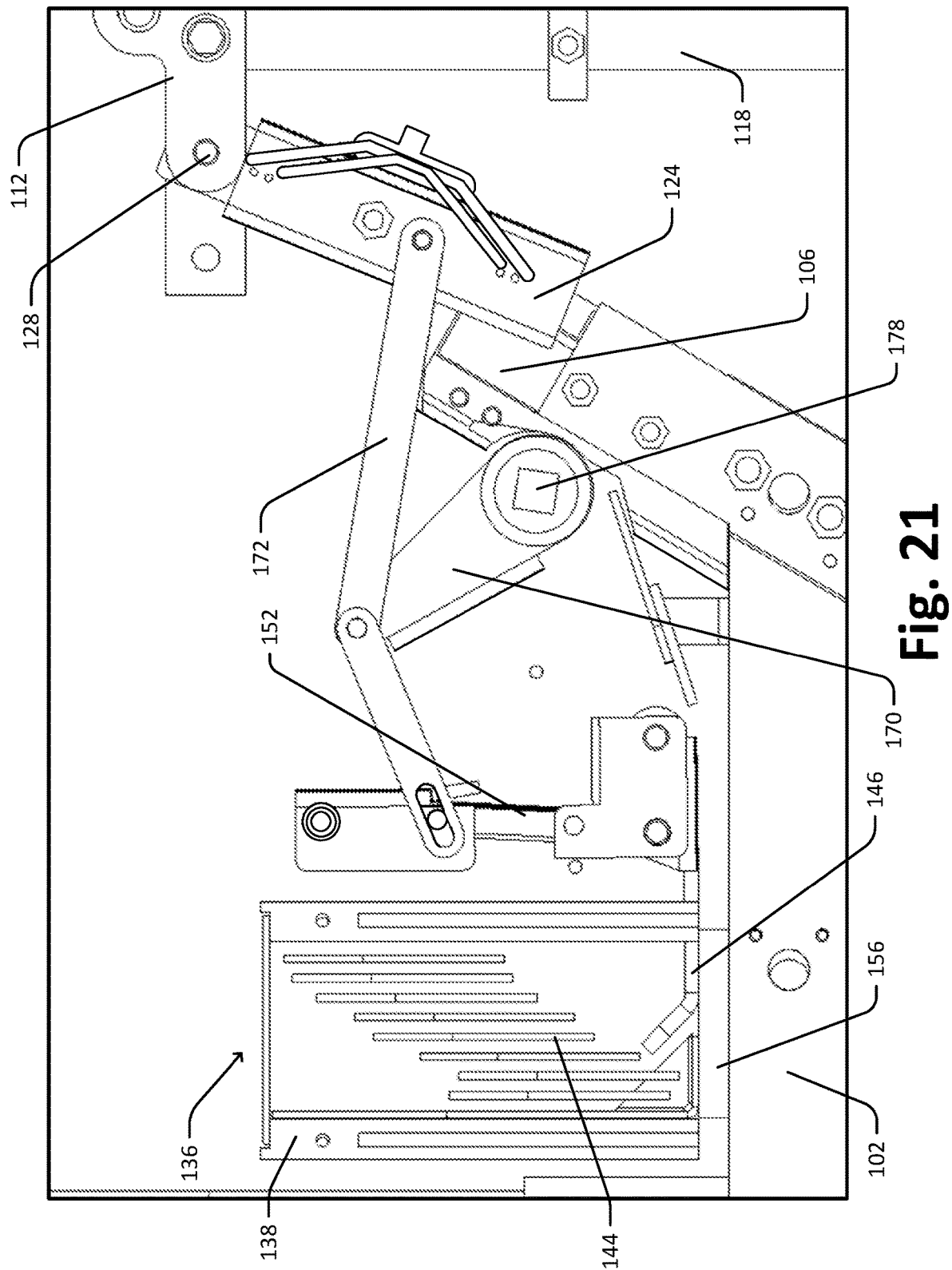
FIG. 21 is a diagram of the automatic transfer switch of FIG. 3 where the first blade assembly is in another closed position.
Figure 22:
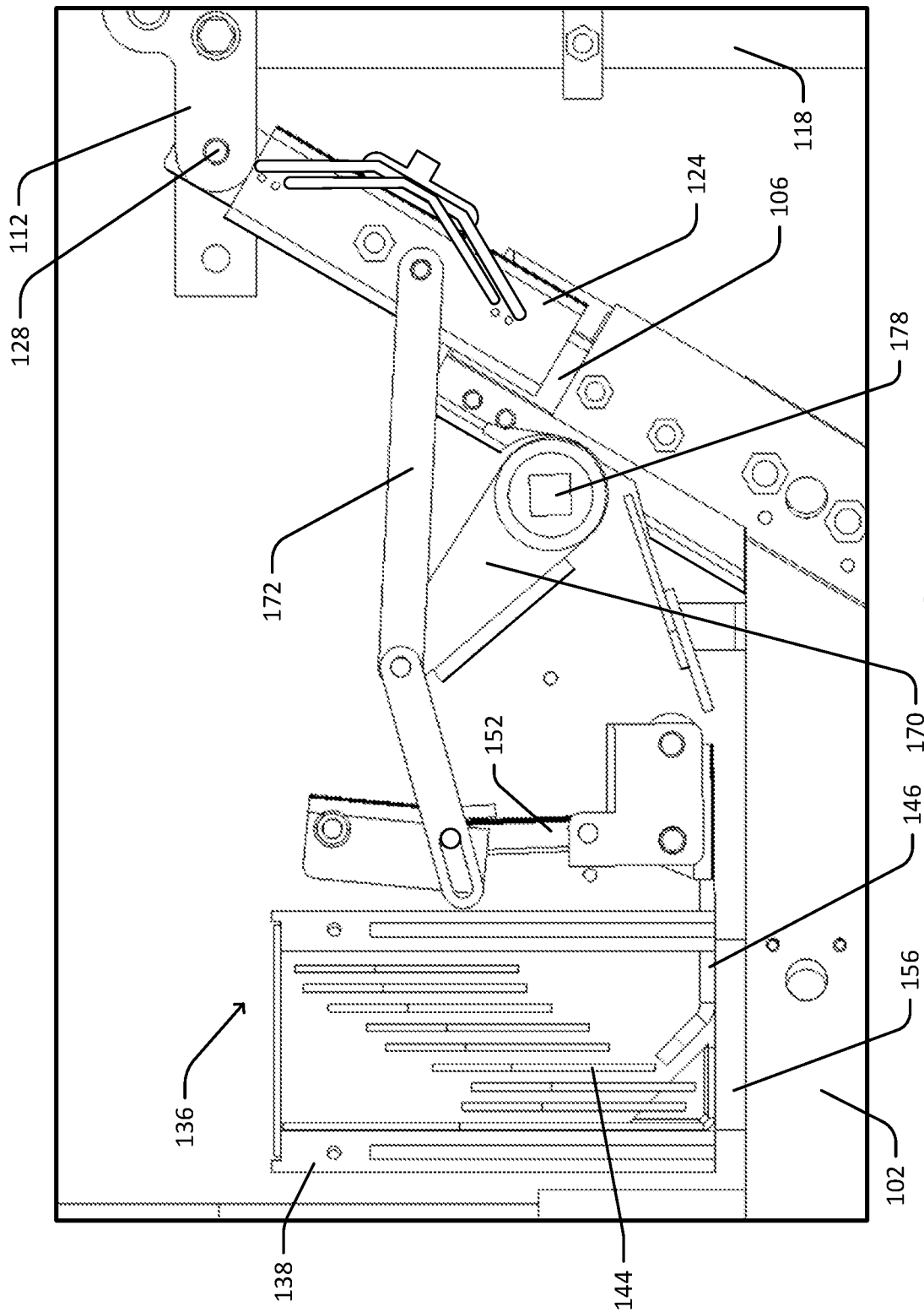
FIG. 22 is a diagram of the automatic transfer switch of FIG. 3 where the first blade assembly is in the completely closed position.

When operating in reverse, the first blade assembly 124 is driven from its completely open position as shown in FIG. 18 to its completely closed position as shown in FIG. 22. Details are not provided for simplicity. Similarly, the timing is that the first movable finger is in contact again with the first conduction member 156 (i.e., the first arc chamber 136 stops functioning) after the first blade assembly 124 is electrically reconnected to the first landing blade 106. In other words, the connection of the main contacts is made before the arc chamber connection is made, as shown in FIG. 20.

In summary, the "break last make first" arrangement (from the perspective of the main contacts) never allows high WCR currents from passing the arc chambers 136 and 140 while allowing the arc chambers 136 and 140 to always break the rated load current by means of arc extinguishing.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An automatic transfer switch comprising:
    a first conduction bar selectively coupled with a first power source at a first conduction bar first end and a load conduction bar at a first conduction bar second end;
    a second conduction bar selectively coupled with a second power source at a second conduction bar first end and the load conduction bar at a second conduction bar second end;
    a first blade assembly electrically coupled to the first conduction bar, wherein the first blade assembly is slidably engageable to make contact with and become electrically coupled to a first source conduction bar in a closed position of the first blade assembly, wherein a first electromagnetic force induced by a first current flowing through the first blade assembly and the first conduction bar repulses the first blade assembly away from the first conduction bar, and wherein the first blade assembly is electrically disconnected from the first source conduction bar in an open position of the first blade assembly; and
    a second blade assembly electrically coupled to the second conduction bar, wherein the second blade assembly is slidably engageable to make contact with and become electrically coupled to a second source conduction bar in a closed position of the second blade assembly, wherein a second electromagnetic force induced by a second current flowing through the second blade assembly and the second conduction bar repulses the second blade assembly away from the second conduction bar, and wherein the second blade assembly is electrically disconnected from the second source conduction bar in an open position of the second blade assembly.

2. The automatic transfer switch of claim 1, further comprising:
    an insulating layer between the first conduction bar and the second conduction bar.

3. The automatic transfer switch of claim 1, further comprising:
    a first landing blade mounted at a first source conduction bar first end, wherein the first landing blade is in contact with and electrically coupled to the first blade assembly in the closed position of the first blade assembly; and a second landing blade mounted at a second source conduction bar first end, wherein the second landing blade is in contact with and electrically coupled to the second blade assembly in the closed position of the second blade assembly.

4. The automatic transfer switch of claim 3, wherein the first source conduction bar is connected to the first power source at a first source conduction bar second end, and the second source conduction bar is connected to the second power source at a second source conduction bar second end.

5. The automatic transfer switch of claim 3, further comprising:
a first top conduction bar coupled with the first conduction bar first end, wherein the first blade assembly is electrically coupled and rotatably connected to the first top conduction bar; and
a second top conduction bar coupled with the second conduction bar first end, wherein the second blade assembly is electrically coupled and rotatably connected to the second top conduction bar, and wherein there is an air gap between the first top conduction bar and the second top conduction bar.

6. The automatic transfer switch of claim 1, wherein the first conduction bar is parallel to the second conduction bar.

7. The automatic transfer switch of claim 1, wherein when the first blade assembly is in the closed position of the first blade assembly and the second blade assembly is in the closed position of the second blade assembly, the first current and the second current are the same.

8. The automatic transfer switch of claim 1, wherein when the first blade assembly is in the closed position of the first blade assembly and the second blade assembly is in the closed position of the second blade assembly, a current flows between the first power source and the second power source through the first conduction bar, the load conduction bar, and the second conduction bar.

9. The automatic transfer switch of claim 1, wherein when the first blade assembly is in the closed position of the first blade assembly and the second blade assembly is in the open position of the second blade assembly, the first current flows from the first power source to a load.

10. The automatic transfer switch of claim 1, wherein when the first blade assembly is in the open position of the first blade assembly and the second blade assembly is in the closed position of the second blade assembly, the second current flows from the second power source to the load.

11. The automatic transfer switch of claim 3, wherein the first blade assembly has a first blade receiving groove to receive the first landing blade, and two opposite blade contacting surfaces of the first blade receiving groove slidably interface with two opposite groove contacting surfaces of the first landing blade, respectively, in the closed position of the first blade assembly, and wherein the second blade assembly has a second blade receiving groove to receive the second landing blade, and two opposite blade contacting surfaces of the second blade receiving groove slidably interface with two opposite groove contacting surfaces of the second landing blade, respectively, in the closed position of the second blade assembly.

12. The automatic transfer switch of claim 3, further comprising:
a first arc chamber including a plurality of first grids and a first movable finger movable with respect to the plurality of first grids, wherein the plurality of first grids and the first movable finger extinguish a first arc generated when switching the first blade assembly to the open position of the first blade assembly; and
a second arc chamber including a plurality of second grids and a second movable finger movable with respect to the plurality of second grids, wherein the plurality of second grids and the second movable finger extinguish a second arc generated when switching the second blade assembly to the open position of the second blade assembly.

13. The automatic transfer switch of claim 12, wherein the first arc chamber and the first landing blade are located at the two ends of the first source conduction bar, and wherein the second arc chamber and the second landing blade are located at the two ends of the second source conduction bar.

14. The automatic transfer switch of claim 12, wherein the plurality of first grids, the first movable finger, the plurality of second grids, and the second movable finger are made of copper against steel.

15. The automatic transfer switch of claim 1, wherein the first blade assembly and the second blade assembly are driven by a mechanical mechanism.

16. The automatic transfer switch of claim 1, wherein the first blade assembly and the second blade assembly are driven by an electrical mechanism.

17. The automatic transfer switch of claim 1, wherein the first current and the second current have a peak greater than or equal to 100,000 amperes.

18. The automatic transfer switch of claim 1, wherein the first power source is a utility power source, and the second power source is a backup power source.

19. An arc extinguishing system of an automatic transfer switch, the automatic transfer switch comprising a first source conduction bar connected to a first power source, a second source conduction bar connected to a second power source, load conduction bar connected to a load, a first blade assembly operable to electrically couple the first power source to the conduction bar, and a second blade assembly operable to electrically couple the second power source to the conduction bar, the arc extinguishing system comprising:
a first arc chamber mounted in a first arc chamber housing comprising a plurality of first grids and a first pivotable finger driven by a first linkage and coupled to the first blade assembly, the first pivotable finger being pivotable with respect to the plurality of first grids when the first blade assembly is moved, wherein the plurality of first grids and the first pivotable finger extinguish a first arc generated when the first power source is disconnected; and
a second arc chamber mounted in a second arc chamber housing comprising a plurality of second grids and a second pivotable finger driven by a second linkage and coupled to the second blade assembly, the second pivotable finger being pivotable with respect to the plurality of second grids when the second blade assembly is moved, wherein the plurality of second grids and the second pivotable finger extinguish a second arc generated when the second power source is disconnected.

20. The arc extinguishing system of claim 19, wherein the first arc chamber housing is located at an end of the first source conduction bar while the first arc is generated at the other end of the first source conduction bar, and wherein the second arc chamber housing is located at an end of the second source conduction bar while the second arc is generated at the other end of the second source conduction bar.

21. The arc extinguishing system of claim 19, wherein the plurality of first grids, the first pivotable finger, the plurality of second grids, and the second pivotable finger are made of copper against steel.

22. The arc extinguishing system of claim 19, wherein the first pivotable finger is in contact with a first conduction member connected to the first source conduction bar when the first power source is connected, and the first pivotable finger is not in contact with the first conduction member after the first power source is disconnected, and wherein the second pivotable finger is in contact with a second conduction member connected to the second source conduction bar when the second power source is connected, and the second pivotable finger is not in contact with the second conduction member after the second power source is disconnected.

23. The arc extinguishing system of claim 19, wherein the automatic transfer switch further comprises:
   a first landing blade mounted at the other end of the first source conduction bar;
   a second landing blade mounted at the other end of the second source conduction bar;
   a left top conduction bar;
   a right top conduction bar, wherein there is an air gap between the right top conduction bar and the left top conduction bar;
   a left stationary bar, wherein a top end of the left stationary bar is electrically coupled to the left top conduction bar, and a bottom end of the left stationary bar is electrically coupled to the load conduction bar;
   a right stationary bar, wherein a top end of the right stationary bar is electrically coupled to the right top conduction bar, and a bottom end of the right stationary bar is electrically coupled to the load conduction bar; and
   an insulating layer between the left stationary bar and the right stationary bar;
   wherein the first blade assembly is electrically coupled and rotatably connected to the left top conduction bar, wherein in a closed position of the first blade assembly, the first blade assembly is in contact with and electrically coupled to the first landing blade, wherein a first electromagnetic force induced by a first current flowing through the first blade assembly and the left stationary bar repulses the first blade assembly toward the first landing blade, wherein in an open position of the first blade assembly, the first blade assembly is electrically disconnected from the first landing blade, and wherein the first linkage moves as the first blade assembly moves; and
   wherein the second blade assembly is electrically coupled and rotatably connected to the right top conduction bar, wherein in a closed position of the second blade assembly, the second blade assembly is in contact with and electrically coupled to the second landing blade, wherein a second electromagnetic force induced by a second current flowing through the second blade assembly and the right stationary bar repulses the first blade assembly toward the second landing blade, wherein in an open position of the second blade assembly, the second blade assembly is electrically disconnected from the second landing blade, and wherein the second linkage moves as the second blade assembly moves.

24. An automatic transfer switch comprising:
   a first source conduction bar connected to a first power source;
   a first landing blade having two opposite groove contacting surfaces and mounted at an end of the first source conduction bar;
   a second source conduction bar connected to a second power source;
   a second landing blade having two opposite groove contacting surfaces and mounted at an end of the second source conduction bar;
   a load conduction bar connected to a load;
   a left top conduction bar;
   a right top conduction bar, wherein there is an air gap between the right top conduction bar and the left top conduction bar;
   a left stationary bar, wherein a top end of the left stationary bar is electrically coupled to the left top conduction bar, and a bottom end of the left stationary bar is electrically coupled to the load conduction bar;
   a right stationary bar, wherein a top end of the right stationary bar is electrically coupled to the right top conduction bar, and a bottom end of the right stationary bar is electrically coupled to the load conduction bar;
   a first blade assembly electrically coupled and rotatably connected to the left top conduction bar, wherein the first blade assembly has a first blade receiving groove to receive the first landing blade, and in a closed position of the first blade assembly, two opposite blade contacting surfaces of the first blade receiving groove slidably interface with the two opposite groove contacting surfaces of the first landing blade, respectively, wherein a first electromagnetic force induced by a first current flowing through the first blade assembly and the left stationary bar repulses the first blade assembly toward the first landing blade, and wherein in an open position of the first blade assembly, the first blade assembly is electrically disconnected from the first landing blade;
   a second blade assembly electrically coupled and rotatably connected to the right top conduction bar, wherein the second blade assembly has a second blade receiving groove to receive the second landing blade, and in a closed position of the second blade assembly, two opposite blade contacting surfaces of the second blade receiving groove slidably interface with the two opposite groove contacting surfaces of the second landing blade, respectively, wherein a second electromagnetic force induced by a second current flowing through the second blade assembly and the right stationary bar repulses the second blade assembly toward the second landing blade, and wherein in an open position of the second blade assembly, the second blade assembly is electrically disconnected from the second landing blade;
   an insulating layer between the left stationary bar and the right stationary bar;
   a first arc chamber mounted in a first arc chamber housing including a plurality of first grids and a first movable finger movable with respect to the plurality of first grids, wherein the plurality of first grids and the first movable finger extinguish a first arc generated when switching the first blade assembly to the open position of the first blade assembly; and
   a second arc chamber mounted in a second arc chamber housing including a plurality of second grids and a second movable finger movable with respect to the plurality of second grids, wherein the plurality of second grids and the second movable finger extinguish a second arc generated when switching the second blade assembly to the open position of the second blade assembly.

* * * * *